(12) United States Patent
Zhao

(10) Patent No.: US 10,891,462 B2
(45) Date of Patent: Jan. 12, 2021

(54) IDENTIFYING GEOMETRICAL PROPERTIES OF ROCK STRUCTURE THROUGH DIGITAL IMAGING

(71) Applicant: Saudi Arabian Oil Company, Dhahran (SA)

(72) Inventor: Weishu Zhao, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 47 days.

(21) Appl. No.: 16/167,066

(22) Filed: Oct. 22, 2018

(65) Prior Publication Data
US 2020/0005013 A1    Jan. 2, 2020

Related U.S. Application Data

(60) Provisional application No. 62/691,765, filed on Jun. 29, 2018.

(51) Int. Cl.
| | | |
|---|---|---|
| *G06K 9/34* | (2006.01) | |
| *G06K 9/00* | (2006.01) | |
| *G06T 7/187* | (2017.01) | |
| *G06T 7/11* | (2017.01) | |
| *G06T 5/00* | (2006.01) | |

(52) U.S. Cl.
CPC ............ *G06K 9/0014* (2013.01); *G06T 5/002* (2013.01); *G06T 7/11* (2017.01); *G06T 7/187* (2017.01); *G06T 2207/10056* (2013.01); *G06T 2207/20152* (2013.01)

(58) Field of Classification Search
CPC ........ G06K 9/0014; G06T 2207/10056; G06T 2207/20152; G06T 5/002; G06T 7/11; G06T 7/187; G06Q 50/00; G06Q 50/02

USPC ......................................................... 382/180
See application file for complete search history.

(56) References Cited

U.S. PATENT DOCUMENTS

| | | |
|---|---|---|
| 4,208,732 A | 6/1980 | Ruehle |
| 4,542,648 A | 9/1985 | Vinegar et al. |
| 5,181,171 A | 1/1993 | McCormack et al. |
| | (Continued) | |

FOREIGN PATENT DOCUMENTS

| | | |
|---|---|---|
| WO | WO2012118866 | 9/2012 |
| WO | WO2012118868 | 9/2012 |
| | (Continued) | |

OTHER PUBLICATIONS

Communication Pursuant to Rules 161(1) and 162 EPC in European Application No. 17718181.5 dated Nov. 8, 2018, 3 pages.
(Continued)

*Primary Examiner* — Charles T Shedrick
(74) *Attorney, Agent, or Firm* — Fish & Richardson P.C.

(57) ABSTRACT

A workflow for rock sample image processing is established to determine geometrical parameters of rock texture. Individual pores and grains are identified using Hoshen-Kopelman multi-cluster labeling algorithm and watershedding technique. Separated elements are fitted with ellipses and pore/grain size distributions, aspect ratios and orientations of fitting ellipses are obtained. Such information is especially valuable in interpretation and forward modeling of dielectric responses using textural models. Rock sample images by high-resolution confocal microscopy are selected to test the workflow and results are analyzed.

20 Claims, 16 Drawing Sheets

(56) References Cited

U.S. PATENT DOCUMENTS

| | | | |
|---|---|---|---|
| 6,088,656 | A | 7/2000 | Ramakrishnan et al. |
| 6,574,565 | B1 | 6/2003 | Bush |
| 6,775,619 | B2 | 8/2004 | Nyland |
| 7,363,158 | B2 | 4/2008 | Stelting et al. |
| 7,925,481 | B2 | 4/2011 | Van Wagoner et al. |
| 7,970,545 | B2 | 6/2011 | Sanstrom |
| 8,081,796 | B2 | 12/2011 | Derzhi et al. |
| 8,170,799 | B2 | 5/2012 | Dvorkin et al. |
| 8,184,502 | B2 | 5/2012 | Xu et al. |
| 8,234,923 | B2 | 8/2012 | Ramamurthy et al. |
| 8,380,642 | B2 | 2/2013 | Stundner et al. |
| 8,385,604 | B2 | 2/2013 | Orpen |
| 8,473,213 | B2 | 6/2013 | Zhu et al. |
| 8,583,410 | B2 | 11/2013 | Sisk et al. |
| 8,605,951 | B2 | 12/2013 | Baggs et al. |
| 8,938,045 | B2 | 1/2015 | Dvorkin et al. |
| 9,046,509 | B2 | 6/2015 | Dvorkin et al. |
| 9,047,513 | B2 | 6/2015 | Derzhi et al. |
| 9,201,026 | B2 | 12/2015 | Walls et al. |
| 9,262,713 | B2 | 2/2016 | Shelley et al. |
| 2002/0042677 | A1 | 4/2002 | West |
| 2003/0044061 | A1 | 3/2003 | Prempraneerach |
| 2007/0061079 | A1 | 3/2007 | Hu |
| 2007/0239359 | A1 | 10/2007 | Stelting et al. |
| 2009/0259446 | A1* | 10/2009 | Zhang ............... G06F 30/20 703/2 |
| 2010/0057409 | A1* | 3/2010 | Jones ............... G01N 33/24 703/2 |
| 2010/0198638 | A1* | 8/2010 | Deffenbaugh ....... G01N 23/046 705/308 |
| 2010/0305927 | A1 | 12/2010 | Suarez-Rivera et al. |
| 2011/0103184 | A1* | 5/2011 | Westeng ............... G01V 1/306 367/38 |
| 2011/0191080 | A1* | 8/2011 | Klie ............... G06F 30/00 703/10 |
| 2011/0218950 | A1 | 9/2011 | Mirowski |
| 2012/0150510 | A1* | 6/2012 | Safonov ............... G06F 30/23 703/2 |
| 2012/0221306 | A1 | 8/2012 | Hurley et al. |
| 2012/0275658 | A1* | 11/2012 | Hurley ............... G06T 7/11 382/109 |
| 2012/0277996 | A1* | 11/2012 | Hurley ............... G01V 99/005 702/11 |
| 2012/0281883 | A1* | 11/2012 | Hurley ............... G01N 21/6458 382/109 |
| 2013/0013209 | A1 | 1/2013 | Zhu et al. |
| 2013/0080133 | A1 | 3/2013 | Sung et al. |
| 2013/0297272 | A1 | 11/2013 | Sung et al. |
| 2013/0297273 | A1* | 11/2013 | Altundas ............... G06F 30/20 703/10 |
| 2014/0114627 | A1* | 4/2014 | Jones ............... G06F 30/20 703/2 |
| 2015/0241591 | A1 | 8/2015 | Burmester et al. |
| 2016/0109593 | A1* | 4/2016 | Saxena ............... G01V 1/306 702/16 |
| 2016/0146973 | A1* | 5/2016 | Johnson ............... G01V 1/306 702/2 |
| 2016/0161635 | A1* | 6/2016 | Ramsay ............... G01V 11/00 703/9 |
| 2016/0307312 | A1 | 10/2016 | Sungkorn et al. |
| 2016/0341707 | A1* | 11/2016 | Inan ............... G01N 30/12 |
| 2019/0271793 | A1* | 9/2019 | Wilson ............... G01V 3/30 |
| 2019/0353813 | A1* | 11/2019 | Cobos ............... G01V 1/306 |
| 2020/0040717 | A1* | 2/2020 | Feng ............... E21B 36/04 |
| 2020/0063532 | A1* | 2/2020 | Crouse ............... E21B 43/166 |

FOREIGN PATENT DOCUMENTS

| | | |
|---|---|---|
| WO | 2013149126 | 10/2013 |
| WO | 2015/127349 A1 | 8/2015 |
| WO | WO2016012826 | 1/2016 |
| WO | 2017/011658 | 1/2017 |

OTHER PUBLICATIONS

International Search Report and Written Opinion issued in International Application No. PCT/US2018/051066 dated Nov. 26, 2018, 16 pages.

Sheppard et al., "Techniques for image enhancement and segmentation of tomographic images of porous materials," Physica A: Statistical Mechanics and its Applications, vol. 339, No. 1-2, Aug. 1, 2004, 7 pages.

Zeljkovic et al., "An algorithm for petro-graphic colour image segmentation used for oil exploration," High Performance Computing and Simulation (HPCS), 2011 International Conference on IEEE, Jul. 4, 2011, 6 pages.

Zhou et al., "Segmentation of petrographic images by integrating edge detection and region growing," Computers and Geosciences, Pergamon Press, vol. 30, No. 8, Oct. 1, 2004, 15 pages.

International Search Report and Written Opinion issued in International Application No. PCT/US2019/024763 dated Jun. 26, 2019, 16 pages.

Giboli et al., "Reverse time migration surface offset gathers part 1: a new method to produce classical common image gathers," SEG Technical Program Expanded Abstracts 2012, Sep. 1, 2012, 6 pages.

International Search Report and Written Opinion of the International Searching Authority issued in International Application No. PCT/US2017/024776 dated Jun. 19, 2017; 11 pages.

PCT International Search Report and Written Opinion of the International Searching Authority issued in International Application No. PCT/US2015/022492 dated Aug. 4, 2015; 11 pages.

Office Action issued in GCC Application No. 2015/29123 dated Jan. 10, 2018; 5 pages.

Al Ibrahim and Mustafa, "Multi-scale sequence stratigraphy, cyclostratigraphy, and depositional environment of carbonate mudrocks in the Tuwaiq Mountain and Hanifa formations, Saudi Arabia," Diss. Colorado School of Mines, Arthur Lakes Library, 2014, 208 pages.

Anselmetti et al., "Quantitative characterization of carbonate pore systems by digital image analysis," AAPG Bulletin, vol. 82, No. 10, Oct. 1998, 22 pages.

Assous et al., "Microresistivity borehole image inpainting," Geophysics vol. 79 No. 2, Mar.-Apr. 2014, 9 pages.

Barton et al., "Interactive image analysis of borehole televiewer data. Automated pattern analysis in petroleum exploration," Springer New York, 1992; pp. 223-248.

Chai et al., "Automatic discrimination of sedimentary facies and lithologies in reef-bank reservoirs using borehole image logs," Applied Geophysics, Mar. 2009, vol. 6, No. 1; pp. 17-29.

DMT; "DMT CoreScan 3 High-Tech Core Logging Tool"; http://www.corescan.de/fileadmin/downloads/DMT_CoreScan3_Info.pdf; Jan. 31, 2013; pp. 1-20.

Gaillot et al.; "Contribution of Borehole Digital Imagery in Core-Logic-Seismic Integration"; Scientific Drilling, No. 5; Sep. 2007; pp. 50-53.

Hoshen and Kopelman, "Percolation and cluster distribution, I. cluster multiple labeling technique and critical concentration algorithm," Physical Review Board, vol. 14, No. 8, Oct. 15, 1976, 8 pages.

Hurley et al., "Method to Generate Fullbore Images Using Borehole Images and Multi-point Statistics," SPE 120671, SPE Middle East Oil and Gas Show and Conference, Society of Petroleum Engineers, Mar. 15-18, 2009, 18 pages.

Paulsen et al.; "A Simple Method for Orienting Drill Core by Correlating Features in Whole-Core Scans and Oriented Borehole-Wall Imagery"; Journal of Structural Geology; Published in 2002; pp. 1233-1238.

Selezney et al., "Formation properties derived from a multi-frequency dielectric measurement," SPWLA 47th Annual Logging Symposium, Jun. 4-7, 2006, 12 pages.

Teagle et al.; "Methods" Proceedings of the Integrated Ocean Drilling Program, vol. 309/312; Published in 2006; pp. 1-70.

Thomas et al.; "Rock Physics and Formation Evaluation: Automated Lithology Extraction from Core Photographs" First Break, vol. 29; Jun. 1, 2011; pp. 103-109.

(56) References Cited

OTHER PUBLICATIONS

Vanorio et al., "How mecrite content affects and the transport, seismic and reactive properties of carbonate rocks: Implications for 4D seismic," SEG International Exposition and Annual Meeting, Houston, Oct. 25-30, 2009, 5 pages.
Weger et al., "Quantification of pore structure and its effect on sonic velocity and permeability in carbonates," AAPG Bulletin, vol. 93, No. 10, Oct. 2009, 21 pages.
WellCAD Software, "4.4 Book 1—Basics," V2011.10.17, ALT, Oct. 17, 2011, 11 pages.
Wilkens et al.; "Data Report: Digital Core Images as Data: An Example from IODP Expedition 303"; Proceedings of the Integrated Ocean Drilling Program, vol. 303/306; Published in 2009; pp. 1-16.
Yin et al., "FMI image based rock structure classification using classifier combination," Neural Computing and Applications, 2011, vol. 20, No. 7; pp. 955-963.
GCC Examination Report in GCC Appln. No. GC 2019-37366, dated May 18, 2020, 4 pages.
Anonymous: "Hoshen-Kopelman algorithm-Wi kipedia", is Jun. 2018 (Jun. 18, 2018), XP055616204, Retrieved from the Internet: URL: https://en.wikipedia.org/w/index.php?title=Hoshen-Kopelman algorithm&oldid=846451608 [retrieved on Aug. 28, 2019] 5 pages.
International Search Report and Written Opinion issued in International Application No. PCT/US2019/038904 dated Sep. 6, 2019, 16 pages.
Canadian Office Action issued in Canadian Application No. 3019124 dated Jul. 12, 2019, 5 pages.

\* cited by examiner

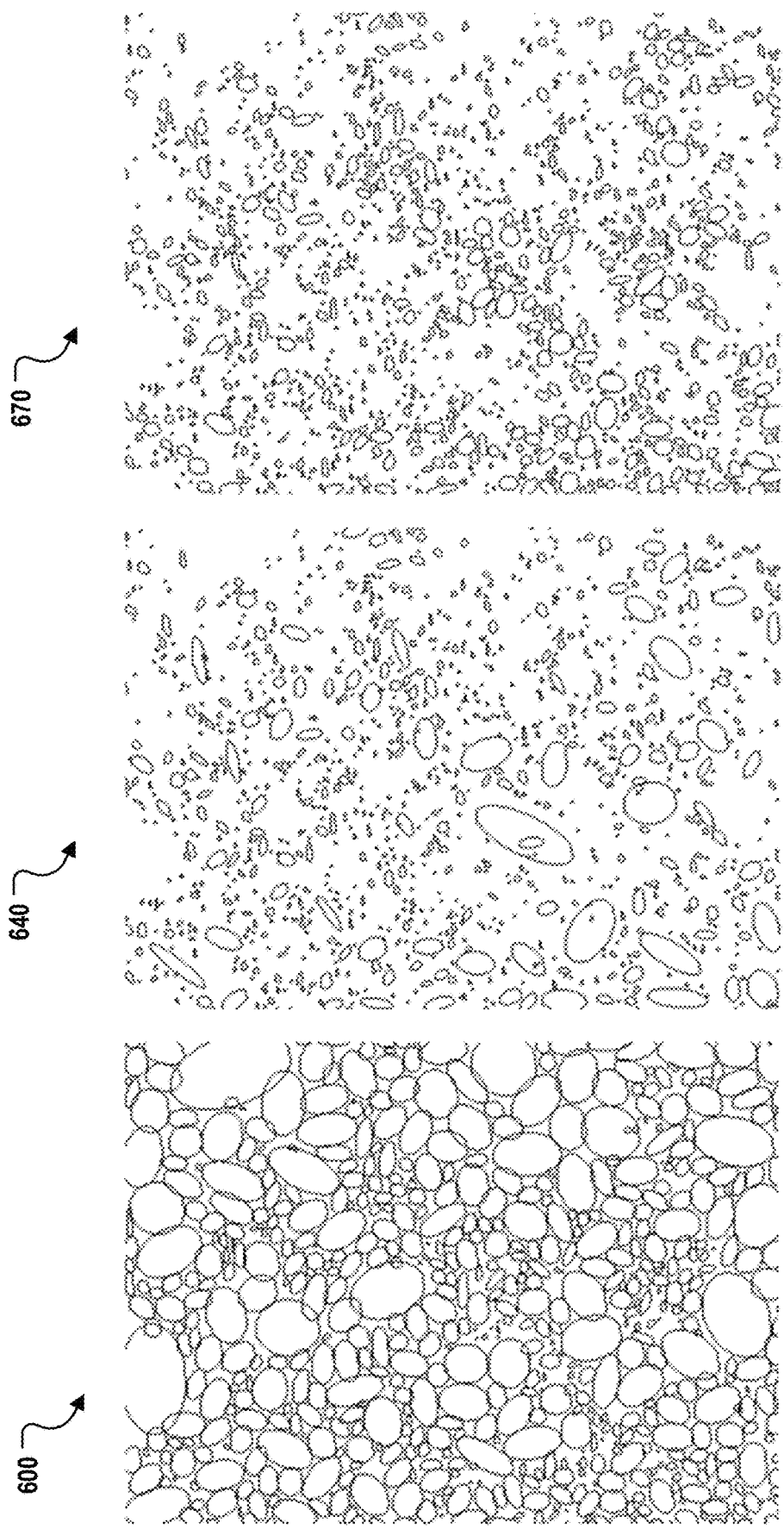

IDENTIFYING GEOMETRICAL PROPERTIES OF ROCK STRUCTURE THROUGH DIGITAL IMAGING

TECHNICAL FIELD

This application claims the benefit of priority to U.S. Provisional Application Ser. No. 62/691,765, filed on Jun. 29, 2018, the contents of which are hereby incorporated by reference.

TECHNICAL FIELD

The disclosure relates to methods, systems and apparatus for the characterization of porous media, specifically that of rock and underground formation materials.

BACKGROUND

Digital imaging (or digital image acquisition) is the creation of photographic images of, for example, a physical scene or the interior structure of an object. Digital imaging may also include the processing, compression, storage, printing, and display of such images. Digital imaging can be classified by the type of electromagnetic radiation or other waves whose variable attenuation, as they pass through or reflect off objects, conveys the information that constitutes the image. This information is converted by, for example, image sensors into digital signals that are processed by a computer that outputs an image. For example, the medium of visible light allows digital photography, such as digital videography, with various kinds of digital cameras. Other examples mediums include X-rays, gamma rays, sounds waves, and radio waves. Digital X-ray imaging, such as digital radiography; fluoroscopy; and computed tomography (CT) are examples of digital imaging using X-rays. Digital gamma ray imaging digital scintigraphy, single-photon emission computed tomography (SPECT), and positron-emission tomography (PET) are examples of digital imaging using gamma rays. Ultrasonography, such as medical ultrasonography and sonar, is an example of digital imaging using sound waves. Radar is an example of digital imaging using radio waves. Additionally, digital imaging lends itself well to image analysis by software and image editing, such as manipulation.

SUMMARY

The present disclosure describes methods and systems, including computer-implemented methods, computer-program products, and computer systems and computer systems, for performing rock sample characterization. The resultant information is more realistic, and therefore provides for greater accuracy. The information supports numerical model building for enhanced formation characterization comprising hydrocarbon-bearing porous media.

In a general implementation, an image depicting a rock sample from a reserve is received. The image is binarized into two—a first population and a second population—such that the first population represents empty space in the rock sample and the second population representing a solid matrix in the rock sample. A porosity of the rock sample is calculated based on the first and the second populations. The porosity includes a measure of the empty space in the rock sample. When the calculated porosity meets a threshold as compared to a measured value, a binary image of the rock sample is generated based on the first and second populations. Geometrical properties of the empty space and the solid matrix of the rock sample are determined based on a particle analysis of the binary image. A digital model of the rock sample is generated based on the geometrical properties of the empty space and the solid matrix of the rock sample. A productivity of the reserve is determined according to the digital model of the rock sample.

Implementations include a process to increase the reliability and accuracy of rock characterizations and numerical model building used to assist in characterizing porous media. Compared to conventional thin section analysis, where the pore/grain system is qualitatively described, the digital image analysis provided by the described system allows for a quantitative characterizations of rock samples through identifying simplified and representative geometrical information of the rock structure from rock sample images.

The details of one or more implementations of the subject matter of this specification are set forth in the accompanying drawings and the later description. Other features, aspects, and advantages of the subject matter will become apparent from the description, the drawings, and the claims.

DESCRIPTION OF DRAWINGS

FIGS. 6A-6C depict example images of particles from a rock sample image fitted to ellipses.

DETAILED DESCRIPTION

Figure 1:
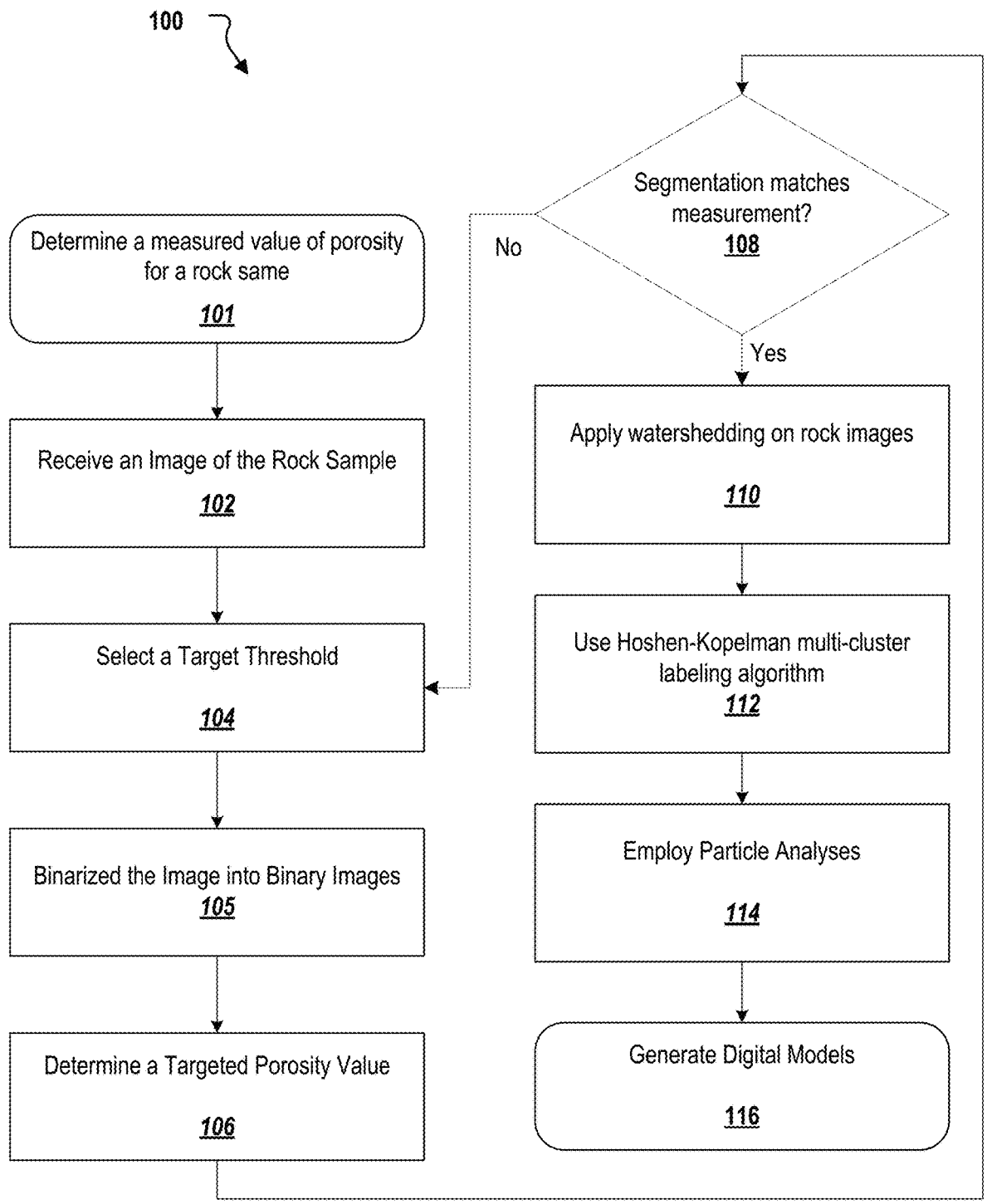
FIG. 1 depicts a flow diagram of an example imaging process to determine geometrical parameters of rock texture for a rock or core sample through generating a digital model of the rock sample.

This disclosure generally describes an optimization methodology for characterizing porous media, specifically that of rock and underground formation materials. The disclosure is presented to enable any person skilled in the art to make and use the disclosed subject matter in the context of one or more particular implementations. Various modifications to the disclosed implementations will be readily apparent to those skilled in the art, and the general principles defined within this application may be applied to other implementations and applications without departing from scope of the disclosure. Thus, the present disclosure is not intended to be limited to the described or illustrated implementations, but is to be accorded the widest scope consistent with the principles and features disclosed within this application.

Digital imaging can be employed as a powerful tool to assist in characterizing porous media, which is useful in various industries. Examples of such porous media include geological cores and rock samples. The oil and natural gas industry relies on rock samples, for example, to determine the productivity of reserves that may potentially be drilled. In such scenarios, the analysis of rock samples may reveal a myriad of details regarding the history and formation of reserves and the surrounding ground formations. Accordingly, this analysis can be used to predict and characterize the nature of specific reserves to determine whether each may produce hydrocarbons. For example, analysis of the particular particles and fluid that comprise a rock sample may reveal the architecture of a reservoir, such as the depth at which certain rock formations occur or the amount of the oil, natural gas, or both contained in the reservoir.

In view of the forgoing, the described system is employed to identify geometrical properties of rock structures though analysis of digital imaging of a rock sample(s). The described system can be used to improve the reliability of data being collected by, for example, increasing compression efficiency, removing losses, or both. For example, the structural information identified in rock samples can be used to generate digital rock models, such as histograms or textual models, which may be employed in the forward modeling of dielectric and acoustic responses on reservoir rock samples. In some implementations, the digital rock models are used to display internal rock textures. These internal rock texture may be determined by, for example, size and shape variations of the solid matrix. A solid matrix may include grains within the rock sample as well as the contacts between these grains. These digital rock model images can be viewed as virtual representations of the actual rock sample and allow, for example, numerical investigation of internal rock structures. Compared to conventional thin section analysis, where the pore/grain system is qualitatively described, the digital image analysis provided by the described system allows for quantitative characterizations of rock samples.

FIG. 1 depicts a flow diagram of an example imaging process 100 to determine geometrical parameters of rock texture for a rock or core sample through generating a digital model of the rock sample. For clarity of presentation, the description that follows generally describes method 100 in the context of FIGS. 2-10. However, it will be understood that method 100 may be performed, for example, by any other suitable system, environment, software, and hardware, or a combination of systems, environments, software, and hardware as appropriate. In some implementations, various steps of method 100 can be run in parallel, in combination, in loops, or in any order. In some implementations, individual pores and grains are identified using a Hoshen-Kopelman multi-cluster labeling algorithm and watershedding techniques, which are described in detail below in the description of steps 110 and 112. Within the generated rock models, separated elements may be fitted with ellipses and pore or grain size distributions, aspect ratios, and orientations of fitting ellipses are obtained.

At 101, a measured value of porosity for a rock same is determined. Porosity is a measure of the void or empty fraction of an otherwise solid material, such as the rock sample. Other terms such as "voids", "void space" and "empty space" are also useful to describe where there is a lack of material within both a rock sample and the formation or reservoir being characterized. Porosity may be described in terms of percentage (0 to 100) or fractions of 1. In some implementations, the measured value is a lab measured porosity using testing means for determining porosity of a rock or core sample that is known to one of ordinary skill in the art. In other embodiments, the measured value is an estimate provided by another computer-based system, including a formulation simulator, or a human user. From step 101, the process proceeds to step 102.

At 102, an image of the rock sample is received. The image may be generated by any means that is operable to provide image detail down to the nanopore level of a rock sample. Examples include confocal microscopy, scanning electron microscopy (SEM), backscattered electron microscopy (BSEI), confocal laser scanning microscopy, and micro-computed tomography (micro-CT). The image may be of a rock sample that is thin or a sliced section. The image may be in any image known format, including but not limited to, Tagged Image File Format (TIFF), Joint Photographic Experts Group (JPEG) format, Graphic Interchange Format (GIF), and Portable Network Graphics (PNG) format. The image may be in a raw or uncompressed format. From step 102, the process proceeds to step 104.

At 104, a target threshold is selected to segment continuous gray-scale rock images into binary images. The value selected for a cutoff value may depends on the image histogram, as shown in FIG. 3B. From 104, the process 100 proceeds to 105.

At 105, the image is binarized into binary (1/0) images based on the threshold. Through binarization, the histogram of a gray-scale image can be separated into two individual populations with one representing porous material and the other representing solid matrix, such as grains and hydrocarbons. Optionally, received images may be filtered to remove noises or enhance the contrast. From 105, the process 100 proceeds to 106.

At 106, a targeted porosity value is determined by point counting using the binary image generated in step 105. Because the segmented image is binary, that is, for example, the solid pixels have a value of 1 and the void pixels have a value of 0, the targeted porosity value can be determined as percentage of detected void pixels to the number of detected total pixels in the binarized image. In an alternative embodiment, the targeted porosity value can be further limited to only count the number of void pixels that are in contact with, adjacent to another void pixel, or both. Such a technique can use the image representation of the sample to determine actual connectivity of void space. In such an embodiment, single or "orphan" pixels can be disregarded from the determination as they could represent error or noise in the image acquisition process or inaccessible void spaces. In some implementations of steps 104, 105, 106, a program such as ImageJ™ or matrix laboratory (MATLAB®) may be used to detect either the void or the solid pixels and thereby automate this aspect of the image processing. From 106, the process 100 proceeds to 108.

At 108, a determination is made whether the targeted porosity value matches a measured value for porosity within a target threshold. If the value does not meet the threshold, the process 100 loops back and steps 104 through 106 are repeated until the targeted porosity value matches the measured value within the bounds of the target threshold. When the targeted porosity value matches the measured value or when no measured value is available, the process 100 proceeds to 110.

At 110, watershedding is applied to the rock images to separate the grains. Watershedding is a numerical technique that automatically separates or cuts apart the image of particles that appear to be touching. For example, in a rock sample, individual, neighboring grains or pores may be touching, thus they may not be able to be separated automatically. In some implementations, the watershedding algorithm is applied to the image to find a minimum value based on a value gradient. In this context, a grey scale image is a map where each pixel has a value, from 0 to 255 for example. Pixel values of such rock sample images transition smoothly, such as in a contour map with ridges and troughs, between neighboring pixels such that local value gradient can be found. The pixels with minimum values (locally) form the watershedding lines that divide the image into different segments, such as grains and pores. The negative image may be used when the same procedure is applied on pores. From 110, the process 100 proceeds to 112.

At 112, a Hoshen-Kopelman multi-cluster labeling algorithm is employed to identify grains and pores. The Hoshen-Kopelman algorithm is based on a union-finding algorithm. In some implementations, the Hoshen-Kopelman algorithm is employed for labeling clusters on a grid, where the grid is a regular network of cells, with the cells being either occupied or unoccupied. In the described system, the Hoshen-Kopelman algorithm is employed to label clusters on a grid applied to the generated binary rock image. The grid includes a regular network of cells, where each cell may be either "occupied" or "unoccupied," which is an efficient way of identifying clusters of contiguous cells. Employing the Hoshen-Kopelman algorithm, the described system scans through the grid, as applied to the binary rock image, looking for occupied cells. To each occupied cell, a label may be assigned. In some implementations, the label may correspond to the cluster to which the cell belongs. When a cell has zero occupied neighbors, a cluster label that has not yet be used, such as for a new cluster, may be assigned. When a cell has one occupied neighbor, the same label as the occupied neighbor may be assigned, which indicates that the cells are part of the same cluster. When a cell has more than one occupied neighboring cell, the cluster label assigned to the least value number of occupied neighbors may be assigned to the current cell. Additionally, when neighboring cells have differing labels, the system notes that these different labels correspond to the same cluster. For example, when two pixels of a rock image share a boundary or they are touching, then they are connected. In such an example, each cluster may be labeled by an index integer, such as 1, 2, and 3. The Hoshen-Kopelman algorithm is then employed to label the multiple clusters with indices. Furthermore, geometrical parameters, such as pixel numbers in clusters, can be obtained through statistical analysis. From 112, the process 100 proceeds to 114.

At 114, particle analysis is employed to determine geometrical properties of grains and pores, which may include the aspect ratio, orientation, and size distribution. For example, a grain or pore can be represented with an ellipse shape (see for example FIG. 2). For each ellipse, the aspect ratio is the ratio of major axis length to minor axis length and the orientation is the angle of the major axis and the size is the axis length. Accordingly, these geometrical parameters can be statistically analyzed to obtain the statistical distributions. From 114, the process 100 proceeds to 116.

At 116, digital rock models are generated based on the generated data. In some implementations, the digital models are histograms, textual models, or other statistical distributions, which may be used as the input data for further model development. In some implementations, a digital rock model is generated based on a stochastic or empirical approach. Such digital rock models may represent the porous media qualitatively and the key geometric properties of the modeled elements (see FIG. 2). For example, modeled elements may include sizes, orientations, and aspect ratios, which may be used as fitting geometric parameters. For quantitative modeling, these geometric parameters may be representative of the porous media texture, which can be achieved by analyzing the digital images of the rock samples and the identified geometries.

This information can then be used as inputs to the forward modeling of dielectric and acoustic responses on the reservoirs where the rock samples were taken. For example, the results from the example imaging process 100 can be used to generate models similar to FIG. 2. Such models may be used in, for example, forward modeling of dielectric or acoustic modeling, which may be critical for dielectric/acoustic logging interpretations. The example imaging process 100 simplifies the analysis of porous media by identifying simple geometrical shapes to represent the rock sample. This practice is different from some 'digital rock' models pursuing as high resolution as possible.

Additionally, the generated rock models may be employed to obtain real-time, well-site analysis, such as quick reservoir rock typing when a rock image database or library is available, or to determine parameters for the drilling of a well during, for example, drilling or mud logging. Other potential applications may include reservoir rock typing (RRT), screening for logging/measurement tools, design production/stimulation strategies, and geomechanical analysis. From 116, the process 100 ends.

As used within this application, the term "real-time" refers to transmitting or processing data without intentional delay given the processing limitations of a system, the time required to accurately obtain data, and the rate of change of the data. In some examples, "real-time" is used to describe the analysis and determination of a solution by the described rock sample characterization system.

Figure 2:
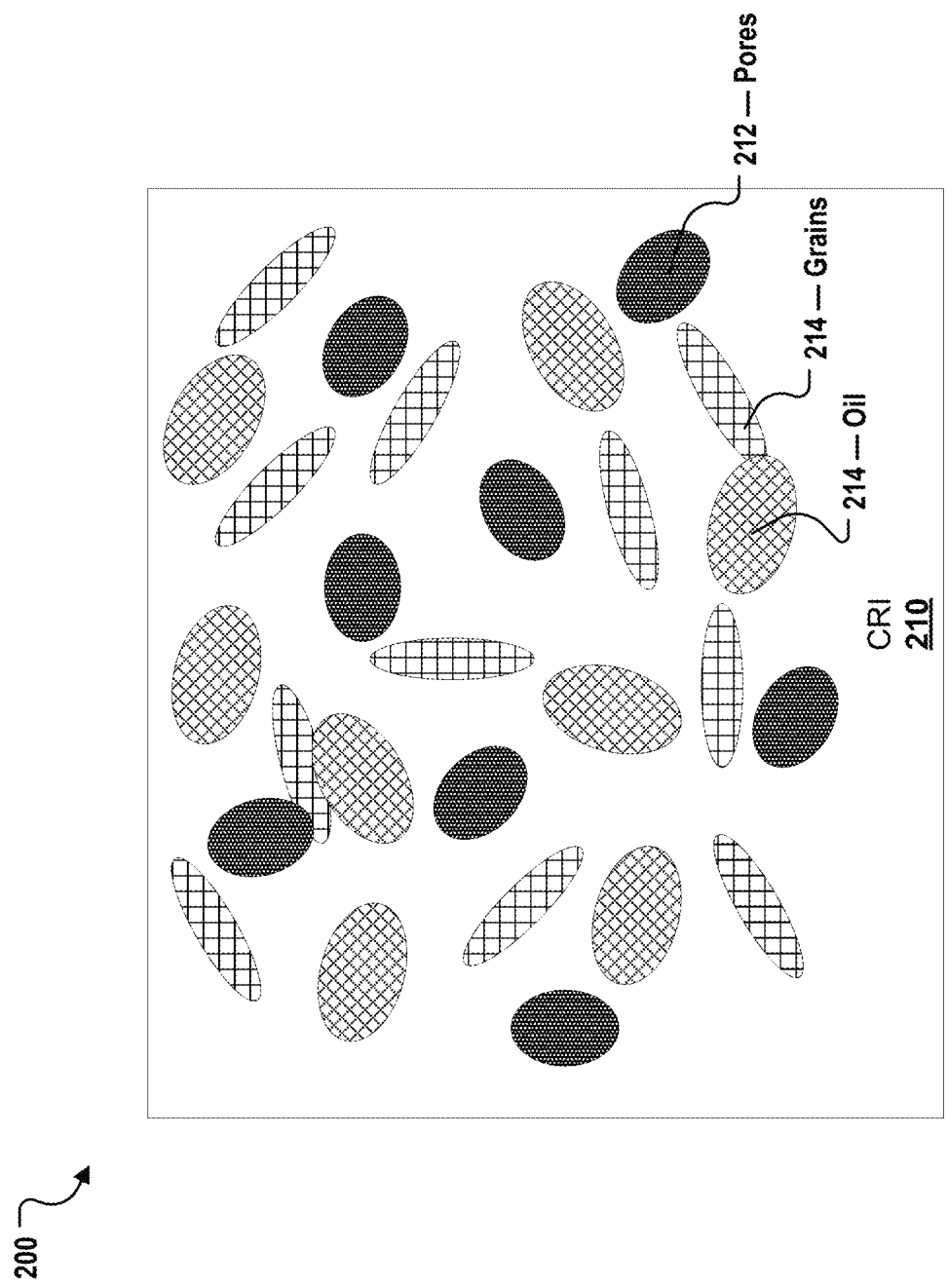
FIG. 2 depicts an example digital rock model that may be generated by the described process.

FIG. 2 depicts an example digital rock model 200 that may be generated by process 100 of FIG. 1. The example digital rock model 200 represents a fluid-saturated rock sample based on, for example, the geometrical parameter of the inclusions, such as aspect ratio. The geometrical parameter of the inclusions is used to calculate the depolarization factors, and accordingly, dielectric responses at different frequencies modeled with the Complex Refractive Index (CRI) mixing law. A CRI is defined to take into account the portion of light that is attenuated as it passes through a medium. The digital rock 200 model may be used for forward modeling of dielectric and acoustic responses on reservoir rock samples. The example model 200 includes ellipses (for 2D models) or ellipsoids (for 3D models) that are representations of materials or structures, such as pores 212, grains 214, and oil (or some other hydrocarbon) 216, found in rock samples. The oil ellipse 216 represents particles of oil found in a modeled rock sample. Likewise, grain ellipse 214 represents grains of other types of particles, such as quartz or mica, found in a modeled rock sample. The pore ellipse 212 represents the empty space found in a modeled rock sample. For simplicity, these three structures, pores 212, grains 214, and oil 214, are used as an example. Other types of structures and materials may be found in analyzed rock samples.

To determine geometrical properties and to fit to ellipses, as shown in FIG. 2, a point counting algorithm may be employed. Ellipse fitting can be built using ImageJ, Fiji™, or other custom tools. For many rock images, non-fitting elements account for a very small portion and are thus statistically unimportant. Aspect ratio, such as major and minor, are input parameters that may be used to build models, such as the digital rock model 200, which may be employed for dielectric simulations, acoustic simulations, or both. Other information, such as pore or grain size distributions, may also be included in the generated models.

Figure 3A:
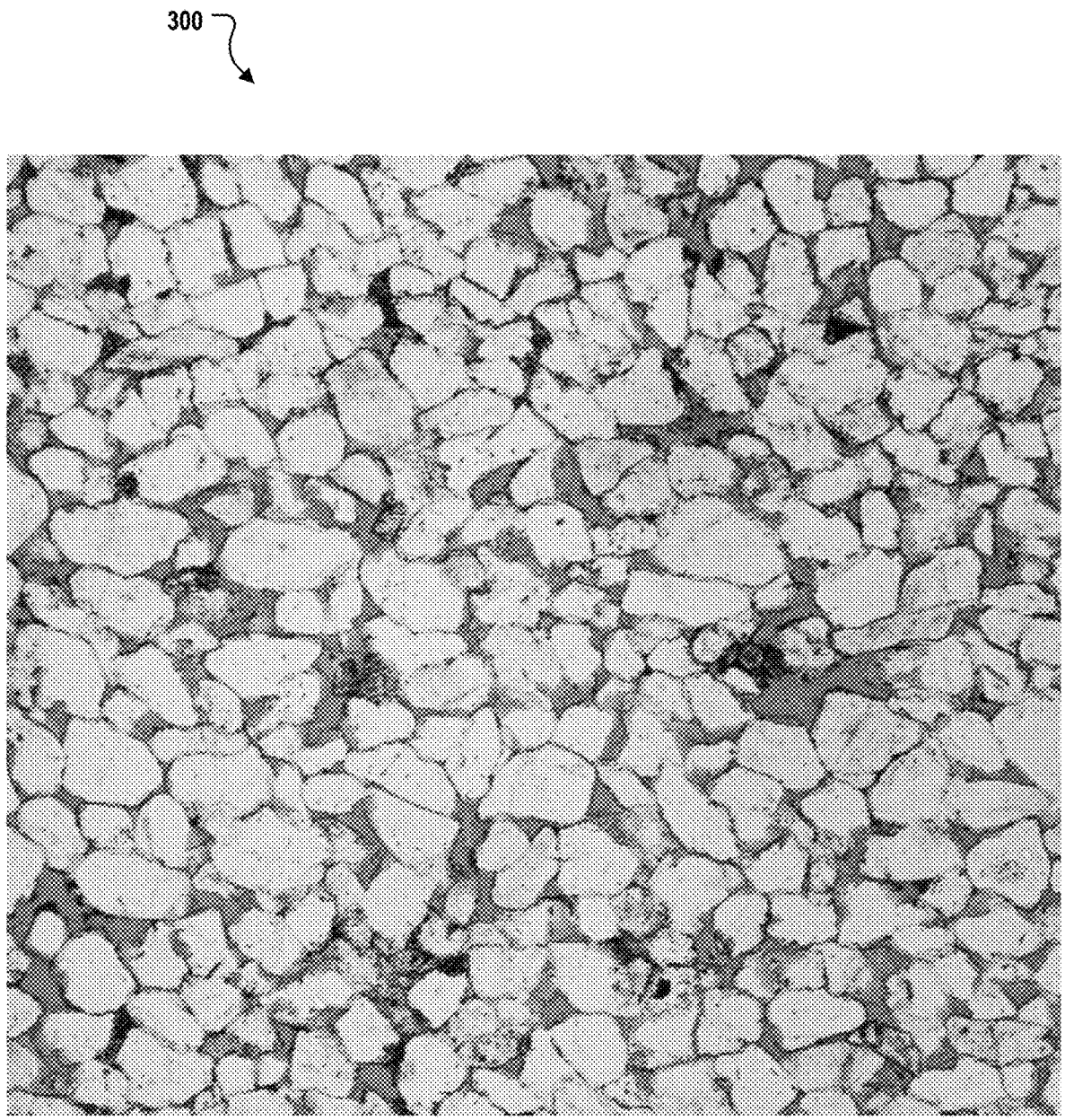
FIGS. 3A-3C depict segmentation of a gray-scale image into a binary image by adjusting a threshold to obtain a satisfied binary image.
Figure 3B:
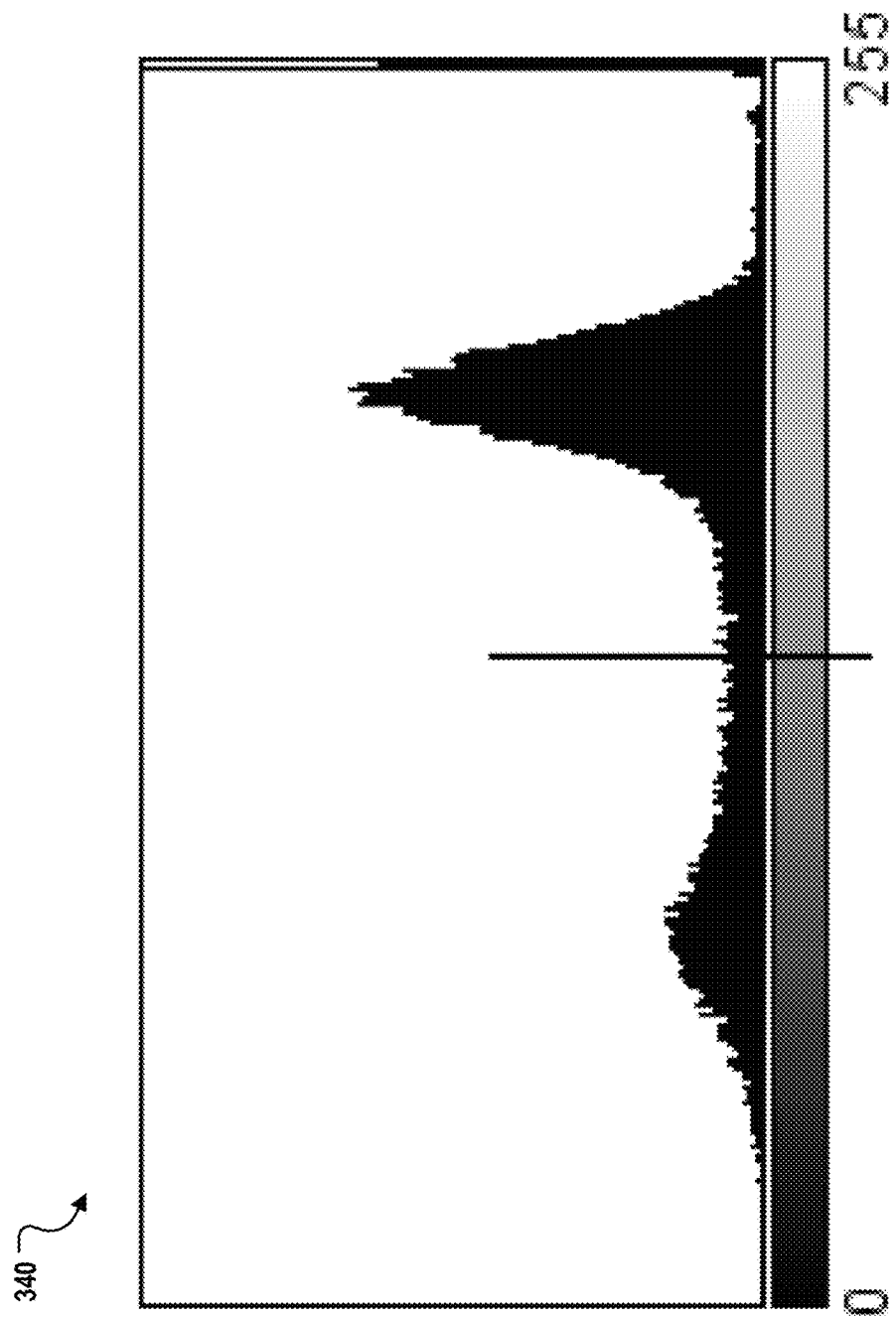
Figure 3C:
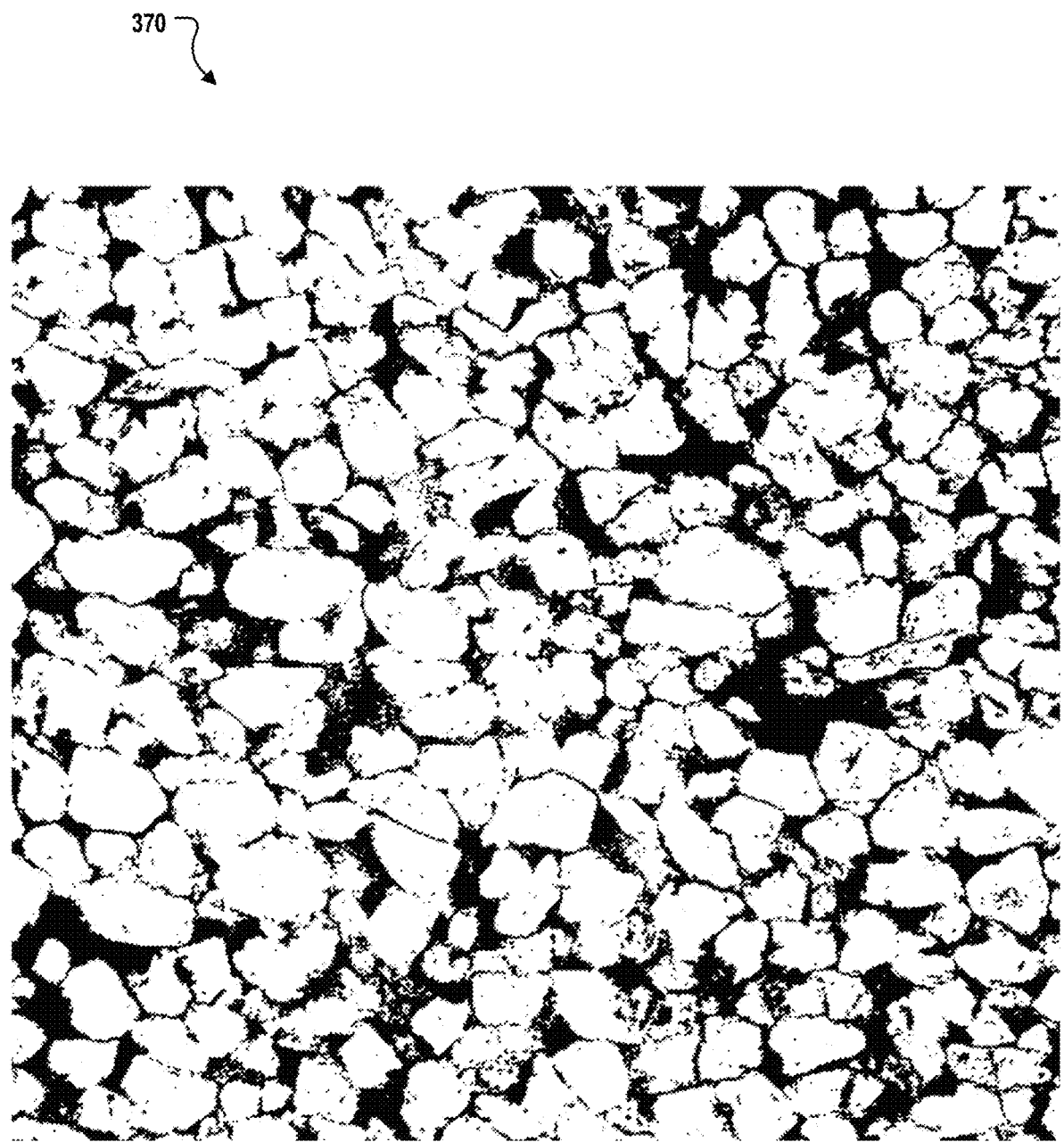

FIGS. 3A-3C depict segmentation of a gray-scale image 300 (FIG. 3A) into a binary image 370 (FIG. 3C) by adjusting a threshold (thresholding) to obtain a satisfied binary image. The thresholding is represented by the chart 350 depicted in FIG. 3B. In some implementations, to obtain pore geometries and their spatial topologies, a gray-scale image, such as depicted in FIG. 3A, is segmented into a binary black and white image with black representing void or porous space and white representing a solid matrix. Thresholding may be employed for such binarization of the grey scale image. Additionally, filtering may be applied to the original image to remove noises or enhance the contrast. By applying a threshold, the histogram of a gray-scale image can be separated into two individual populations with one indicating porous material and another for solid matrix, such as depicted in FIG. 3C. Furthermore, selecting various thresholds leads to different segmented images. This selection process may be repeated, as represented by chart 350 of FIG. 3B, until a target criterion, for example porosity, is met.

Figure 4B:
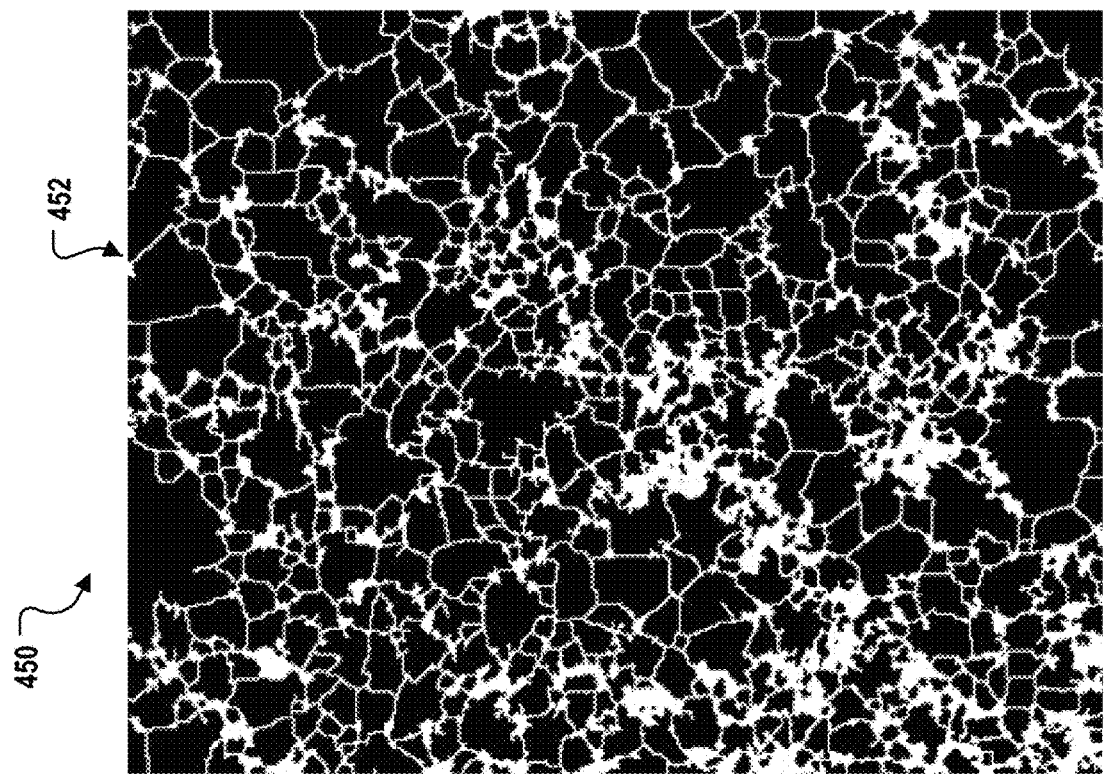
FIGS. 4A-4B depict watershedding a grey scale image into a binary black and white image to separate grain particles.
Figure 4A:
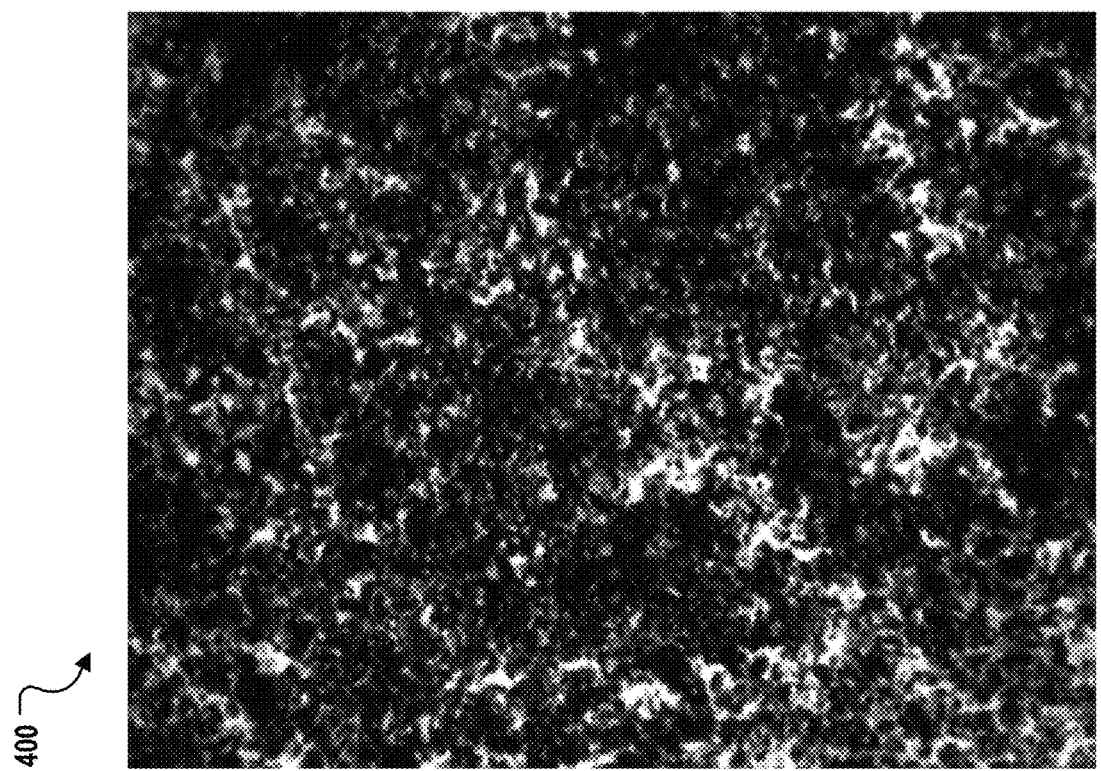

FIGS. 4A-4B depict watershedding a grey scale image 400 (FIG. 4A) into a binary black and white image 450 (FIG. 4B) to, for example, separate grain particles. As described earlier with regard to FIG. 1, watershedding may be employed when individual grains or pores cannot be separated during segmentation. Watershedding an image involves algorithms that calculate, for example, signal gradients in an image and find local minimums. The watershedding lines 452, as shown in FIG. 4B, define different particles for further analysis. In some examples, an image of a rock sample can be made negative to apply watershedding for the identification of individual pores.

Figure 5:
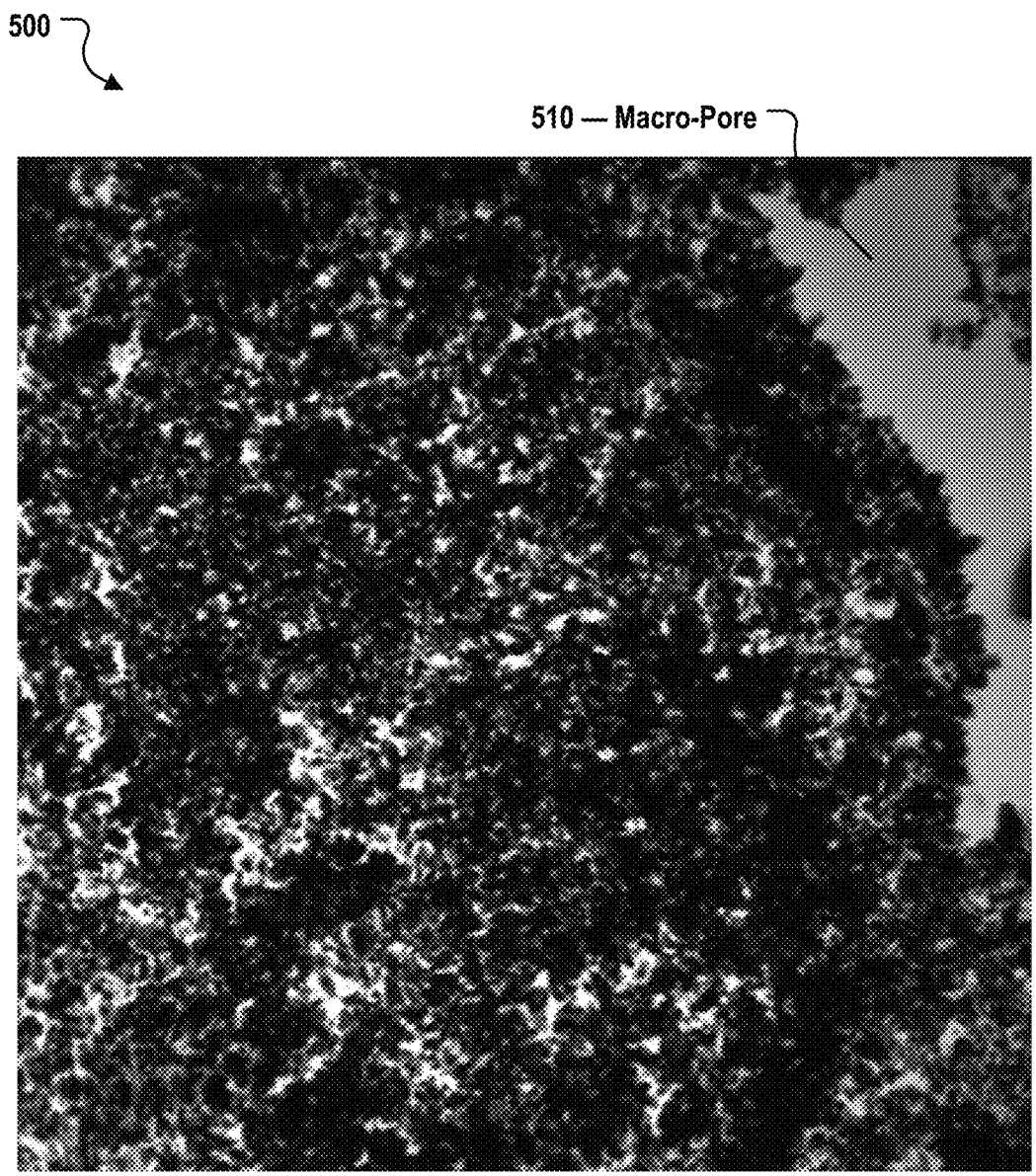
FIG. 5 depicts an image illustrating the application of a Hoshen-Kopelman algorithm to a binary image for multi-cluster labeling.

FIG. 5 depicts an image 500 illustrating the results of the application of a Hoshen-Kopelman algorithm to a binary image, such as depicted in FIG. 4B, for multi-cluster labeling. The depicted image shows pores, such as pores 122 of FIG. 1, represented in black, and solid matrix material, such as grains 114 and oil 116 of FIG. 1, represented in white. The image 500 includes a macro-pore 510 and micro-pores (not labeled) represented by the other areas in black. As described earlier, the Hoshen-Kopelman algorithm is a useful tool to identify and separate image elements. In some implementations, the Hoshen-Kopelman algorithm is applied to a binary image to label multiple clusters with integers based on, for example, the pixel connectivity of the clusters. In such implementations, each element, grain or pore, is labeled with an index and its properties, such as area and equivalent circular diameter, can be computed. The resulting image may be used to differentiate the micro-, meso- and macro-pores for a provided rock sample. Other images generated through the application of the Hoshen-Kopelman algorithm may depict elements, such as pores and grains, in various colors.

FIGS. 6A-6C depict example images 600, 640, 670 respectively of particles from a rock sample image fitted to ellipses. Once particles and pores are identified, as described earlier, they can be analyzed numerically to obtain geometrical properties and be fitted to ellipses. For example, aspect ratios, and the major, minor, and orientation of each fitting ellipse may be computed. The example image 600 (FIG. 6A) depicts grains fitted to ellipses. The example image 630 (FIG. 6B) depicts pores fitted to ellipses without watershedding of the original image. The example image 670 (FIG. 6C) depicts pores fitted to ellipses with watershedding of the original image.

FIGS. 7A-7D, 8A-8D, and 9A-9D depict resulting images from various stages of the described process 100 of FIG. 1. FIGS. 7A-7D depict the results for an example image of a skeletal-peloid grainstone rock sample. FIGS. 8A-8D depict the results for an example image of a dolomitic skeletal wackestone rock sample. FIGS. 9A-9D depict the result from an example image of a meshberger dolomite rock sample. Each of the sample images were generated using confocal microscopy with resolution of 0.264 microns. The orientation of the pores and grain elements may be analyzed based on these generated images. Although randomness may be found within most any rock sample, this analysis is included as a part of the process 100 because it is possible that other rock types have pores or grains aligning in preferential directions.

Figure 7A:
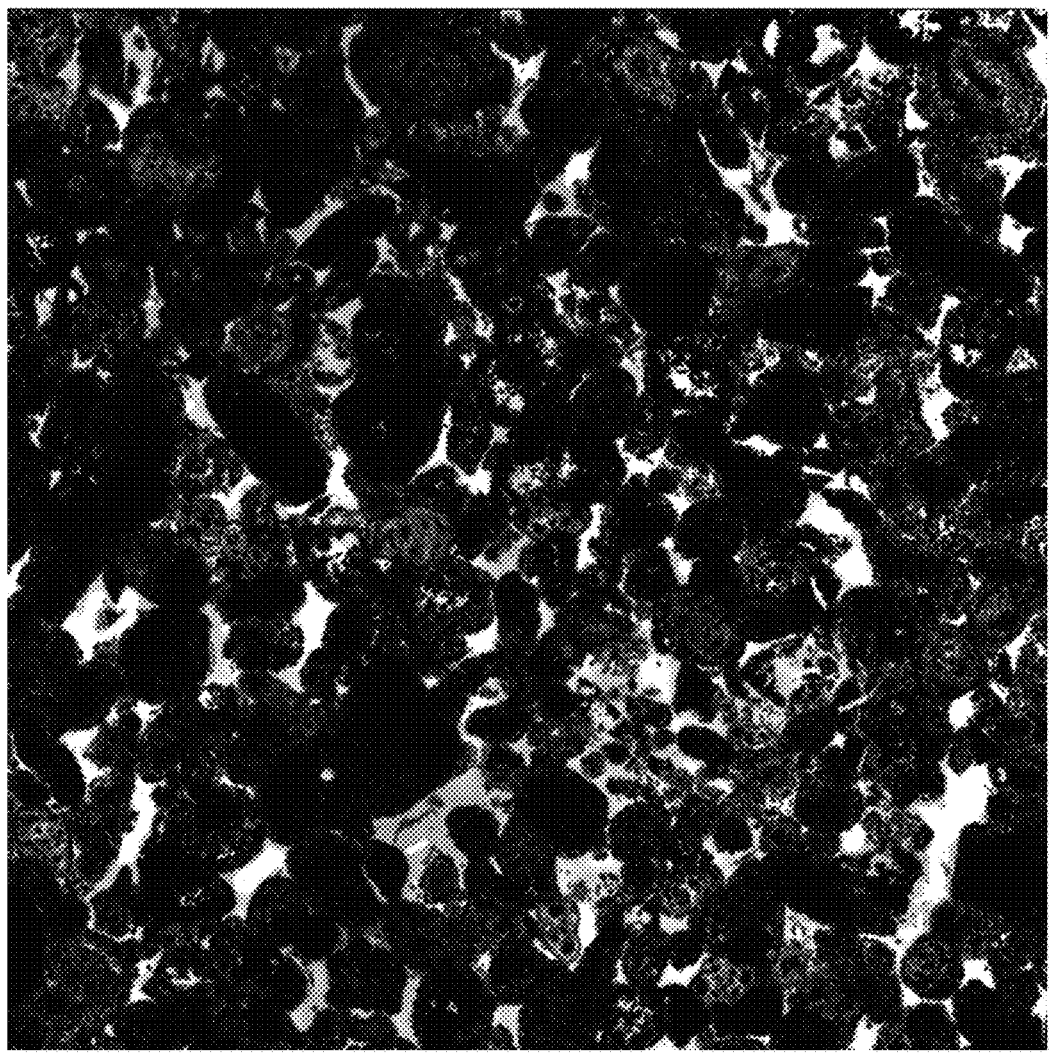
FIGS. 7A-7D depict various results of stages in the described process for an example image of a skeletal-peloid grainstone rock sample.
Figure 7B:
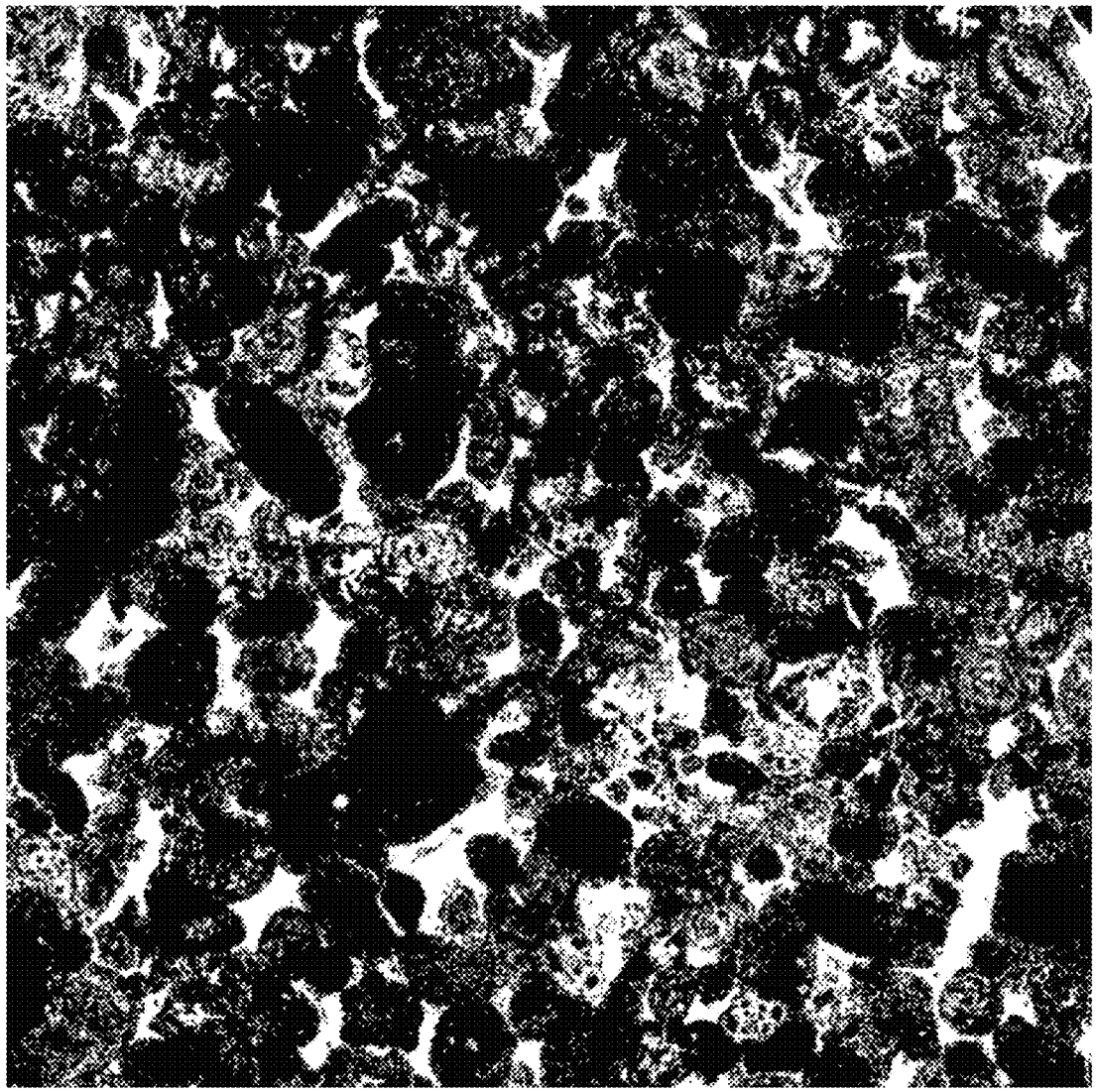

FIG. 7A depicts a gray-scale confocal image 700 of the example skeletal-peloid grainstone rock sample. FIG. 7B depicts a segmented image 720 of the example skeletal-peloid grainstone rock sample. The gray-scale confocal image 700 shown in FIG. 7A is segmented into void (white) and solid (black) to match the measured porosity, as shown in image 720 of FIG. 7B. The image 720 depicts a porosity of 23.7 percent and a permeability of 233.4 millidarcies (mDs). Image 720 depicts the pores of the example skeletal-peloid grainstone rock sample in white and the solid material from the sample in black. Void and solid phases may be analyzed separately using images 700 and 720.

Figure 7D:
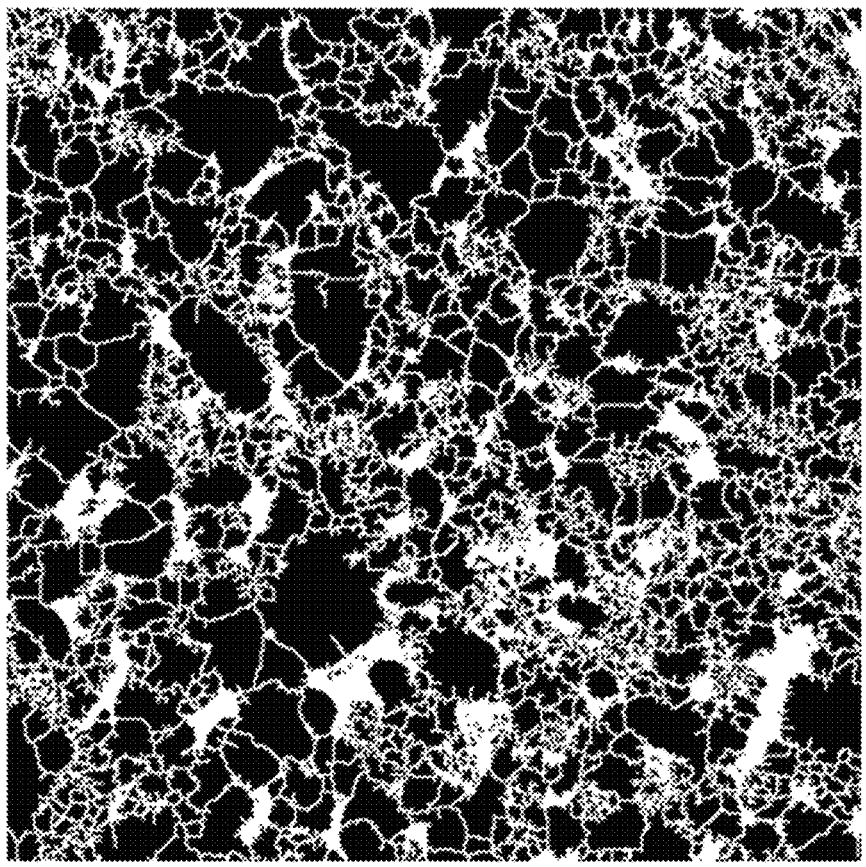
Figure 7C:
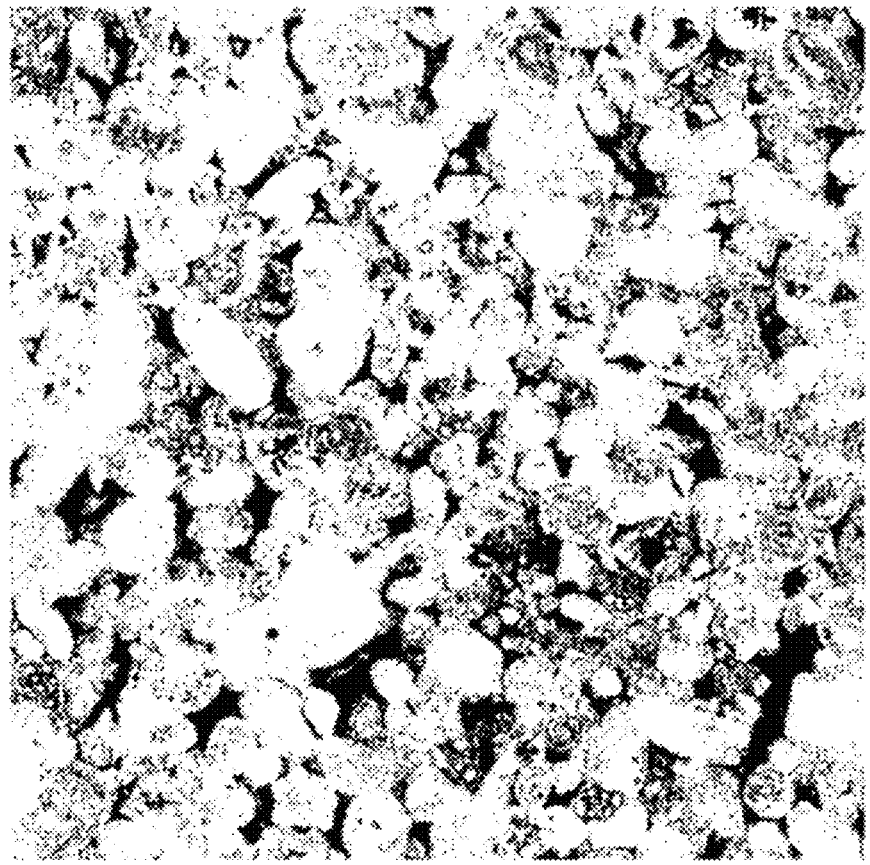

FIG. 7C depicts a negative image 740 of the example skeletal-peloid grainstone rock sample. The image 740 depicts the pore space in black and the solid material in white. A Hoshen-Kopelman multiple clustering algorithm is applied to the pore space to generate the negative image 740. The image 740 may be used to analyze the depicted pore space and solid material of the example skeletal-peloid grainstone rock sample. FIG. 7D depicts an image 760 where watershedding of the solid phase to separate grains in the skeletal-peloid grainstone rock sample has been applied. The image 760 depicts the pores space of the example skeletal-peloid grainstone rock sample in white and the solid material in black.

By employing images 700, 720, 740 and 760, process 100 may generate, based on particle areas, equivalent circular diameters of pores and grains to show the pore and grain size distributions within the example skeletal-peloid grainstone rock sample. For example, porosities in the example skeletal-peloid grainstone rock sample can be categorized into micro- (<2 microns), meso- (2-10 microns), and macro- (>10 microns) porosities. As depicted in the example images 700, 720, 740, and 760, macro-, meso-, and micro-porosities are 20.23 percent, 2.77 percent, and 0.76 percent, respectively. Cutoffs for pore type classification may also come from experience or observation of the pore size distribution.

Applying process 100 to example images of the skeletal-peloid grainstone rock sample, both separated pores and grains are fitted with ellipses and an example image of fitted grains may be generated. Additionally, aspect ratio and orientation of the fitting ellipses may also be calculated. For the example skeletal-peloid grainstone rock sample used in FIGS. 7A-7D, aspect ratio for pores ranges from 1 to 12.8 with an average 1.9 and grains from 1 to 7.6 with an average 1.6. The pores and grains with sizes of several pixels were ignored to avoid bias. Distributions of aspect ratios may also be obtained for both grains and pores for the example skeletal-peloid grainstone rock sample.

Figure 8B:
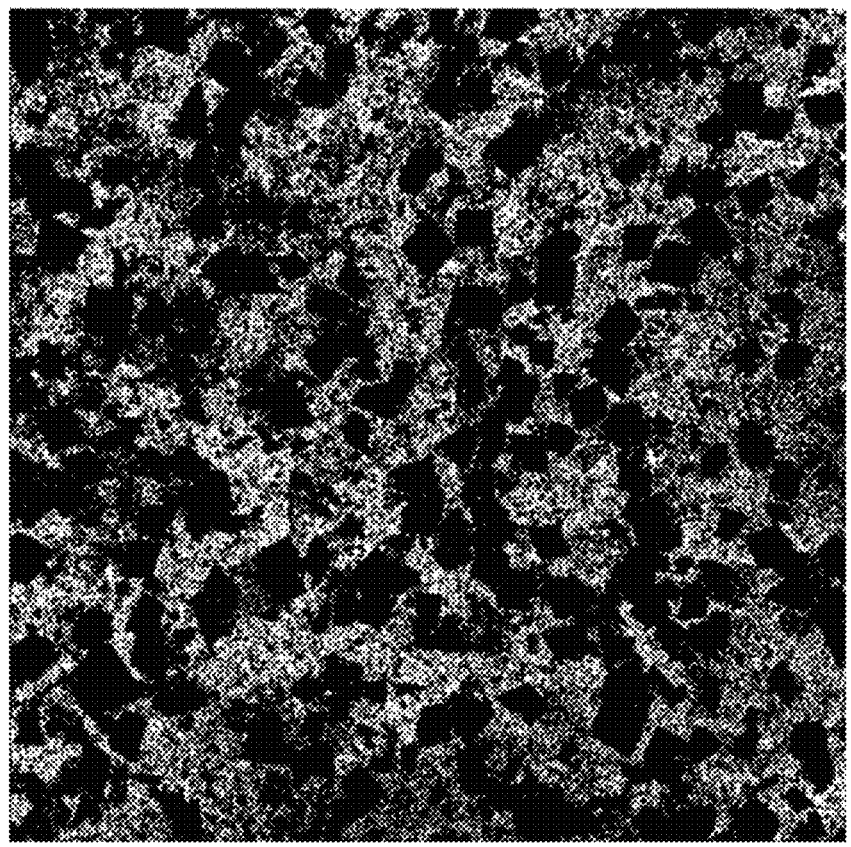
FIGS. 8A-8D depict various results of stages in the described process for an example image of a dolomitic skeletal wackestone rock sample.
Figure 8A:
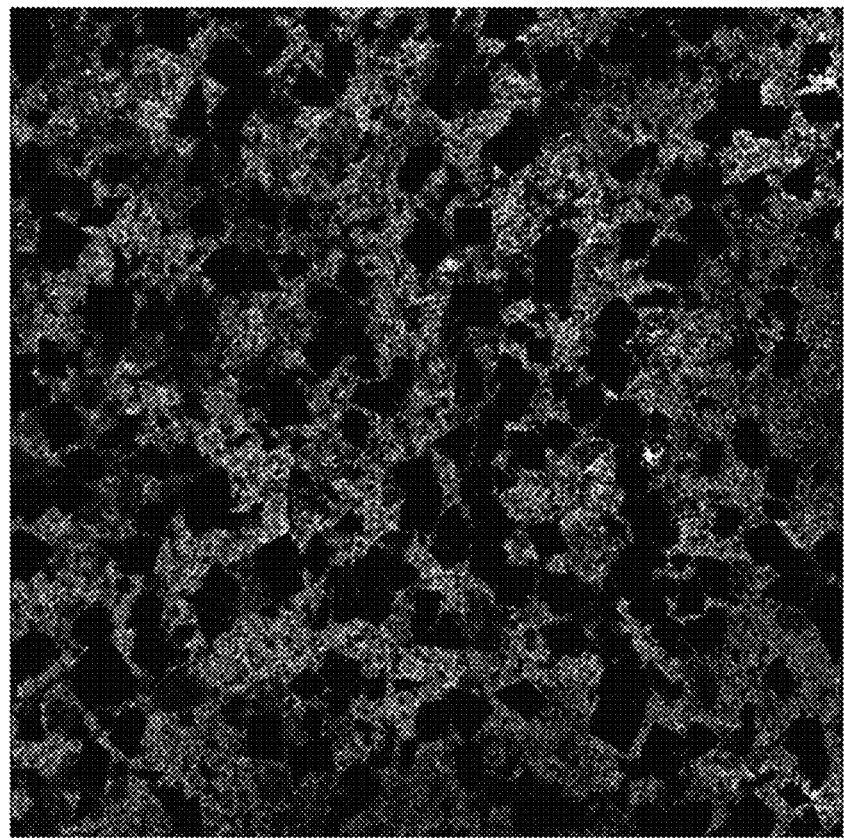

FIG. 8A depicts a gray-scale confocal image 800 of the example dolomitic skeletal wackestone rock sample. FIG. 8B depicts a segmented image 820 of the dolomitic skeletal wackestone rock sample. The gray-scale confocal image 800 shown in FIG. 8A is segmented into void (white) and solid (black) to match the measured porosity, as shown in image 820 of FIG. 8B. The image 820 depicts a porosity of 20.7 percent and a permeability of 8.3 mDs. Image 820 depicts the pores of the example dolomitic skeletal wackestone rock sample in white and the solid material from the sample in black. Void and solid phases may be analyzed separately using images 800 and 820.

Figure 8D:
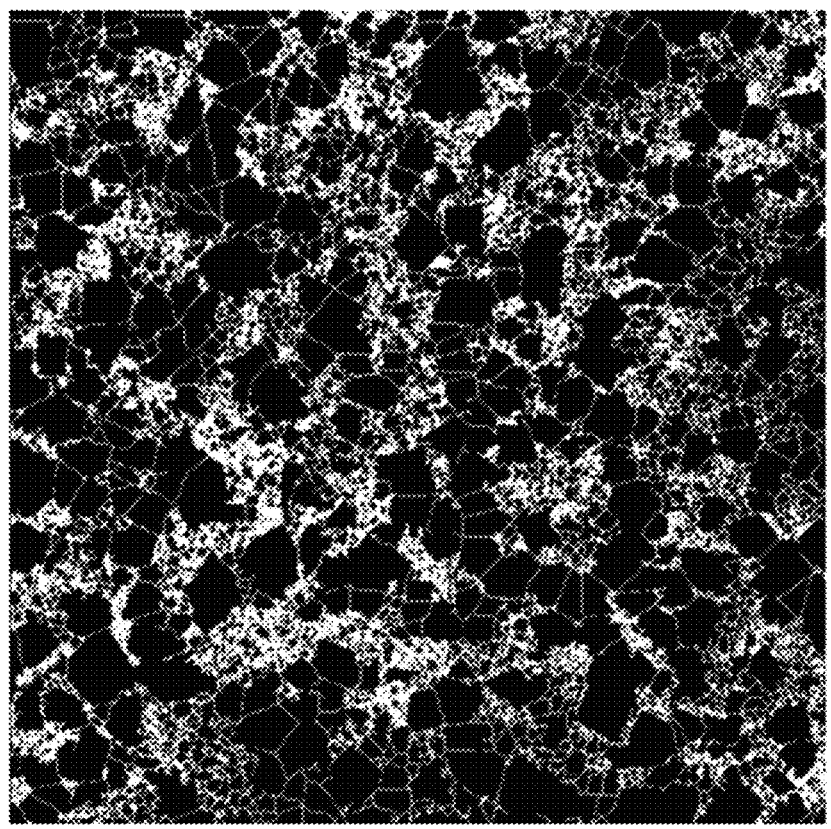
Figure 8C:
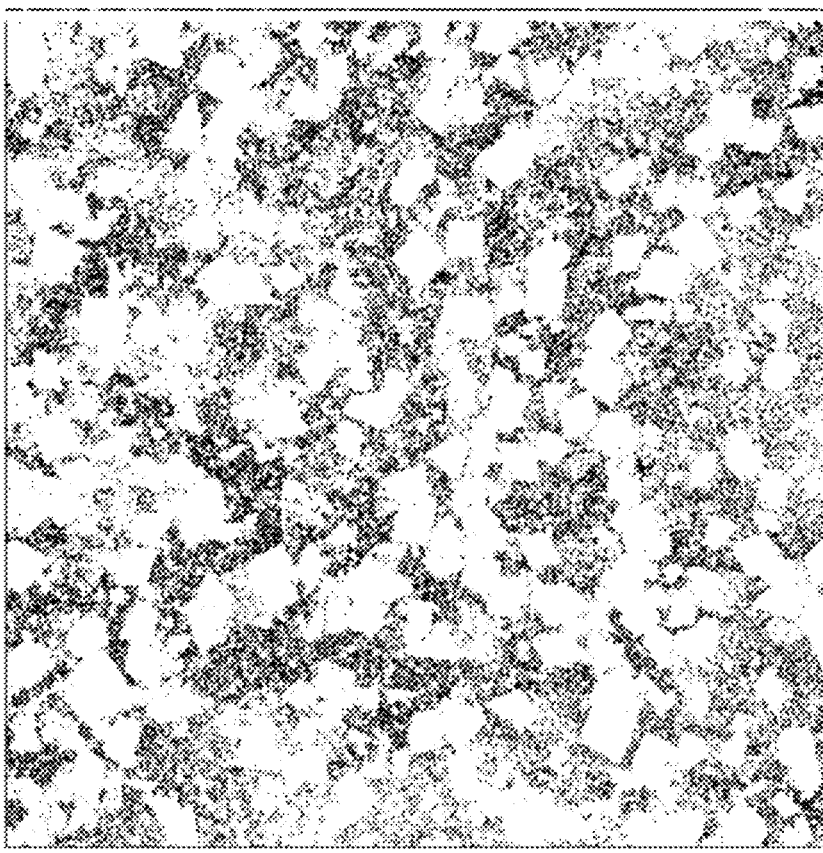

FIG. 8C depicts a negative image 840 of the example dolomitic skeletal wackestone rock sample. A Hoshen-Kopelman multiple clustering algorithm is applied to the pore space to generate the negative image 840. The image 840 depicts the pore space in black and the solid material in white. The image 840 may be used to analyze the depicted pore space and solid material of the example dolomitic skeletal wackestone rock sample. FIG. 8D depicts an image 860 where watershedding of the solid phase to separate grains in the skeletal-peloid grainstone rock sample has been applied. The image 860 depicts the pore space of the example dolomitic skeletal wackestone rock sample in white and the solid material in black.

By employing images 800, 820, 840, and 860, process 100 may generate, based on particle areas, equivalent circular diameters of pores and grains to show the pore and grain size distributions within the example dolomitic skeletal wackestone rock sample. For example, porosities in the example dolomitic skeletal wackestone rock sample can be categorized into micro- (<2 microns), meso- (2-10 microns), and macro- (>10 microns) porosities. As depicted in the example images 800, 820, 840, and 860, macro-, meso-, and micro-porosities are 0.6 percent, 18.7 percent, and 1.4 percent, respectively. Cutoffs for pore type classification may also come from experience or observation of the pore size distribution. Compared to the skeletal-peloid grainstone rock sample depicted in FIGS. 7A-7D, where the pore space is dominated by macro-porosity, example dolomitic skeletal wackestone rock sample is dominated by meso/micro-porosity.

Applying process 100 to example images of the dolomitic skeletal wackestone rock sample, both separated pores and grains are fitted with ellipses and an example image of fitted grain may be generated. Additionally, aspect ratio and orientation of the fitting ellipses may also be calculated. For the example dolomitic skeletal wackestone rock sample used in FIGS. 8A-8D, aspect ratio for pores ranges from 1 to 10.6 with an average 1.62 and grains from 1 to 16.8 with an average 1.54. As with the example skeletal-peloid grainstone rock sample, the pores and grains with size of several pixels were ignored to avoid bias. Distributions of aspect ratios may also be obtained for both grains and pores for the example dolomitic skeletal wackestone rock sample.

Figure 9B:
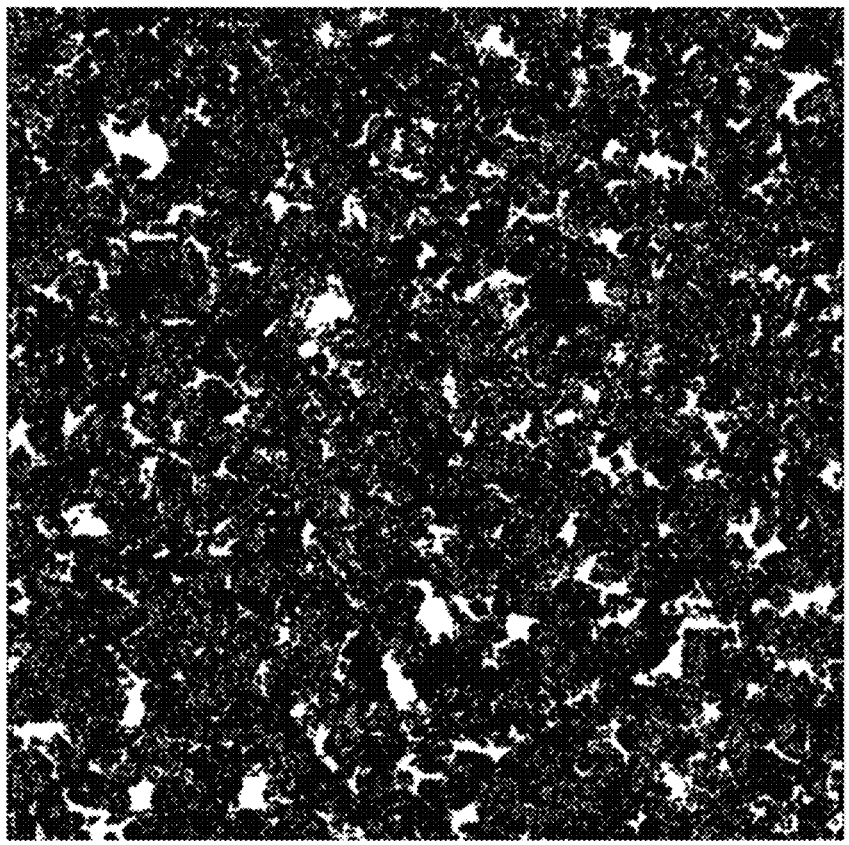
FIGS. 9A-9D depict various results of stages in the described process for an example image of a meshberger dolomite rock sample.
Figure 9A:
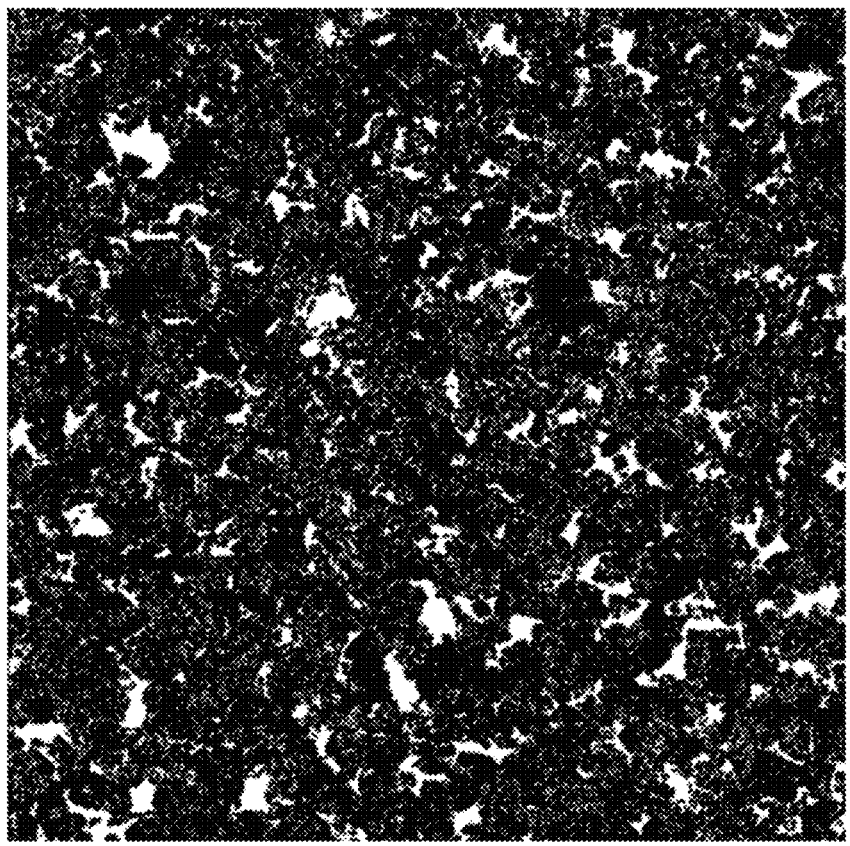

FIG. 9A depicts a gray-scale confocal image 900 of the meshberger dolomite rock sample. FIG. 9B depicts a segmented image 920 of the meshberger dolomite rock sample. The image 920 depicts a porosity of 15.2 percent. The gray-scale confocal image 900 shown in FIG. 9A is segmented into void (white) and solid (black) to match the measured porosity, as shown in image 920 of FIG. 9B. Image 920 depicts the pores of the meshberger dolomite rock sample in white and the solid material from the sample in black. Void and solid phases may be analyzed separately using images 900 and 920.

Figure 9D:
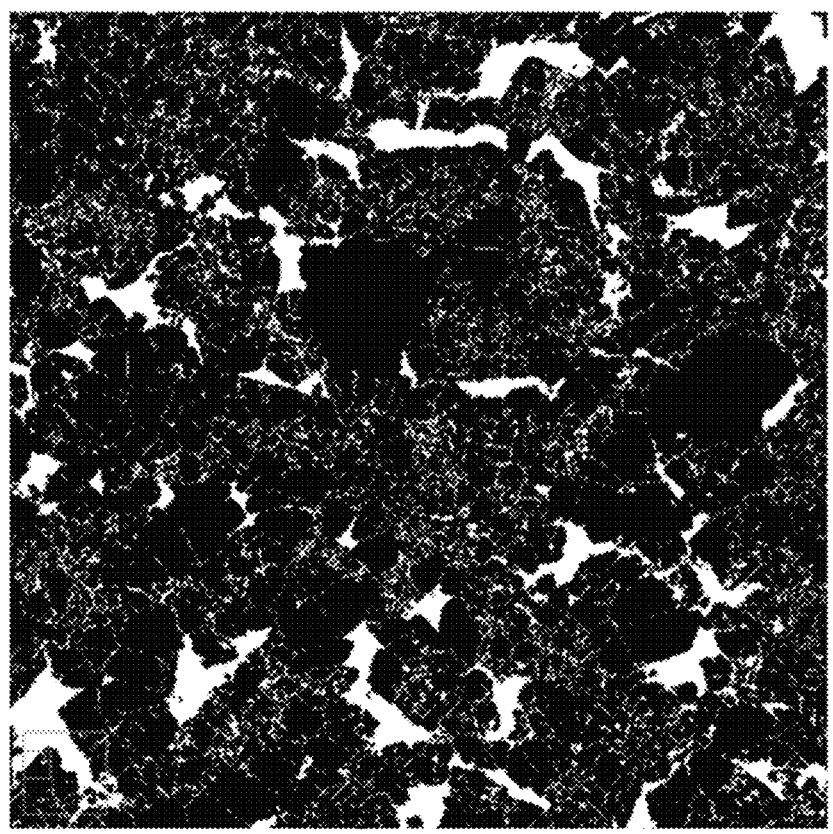
Figure 9C:
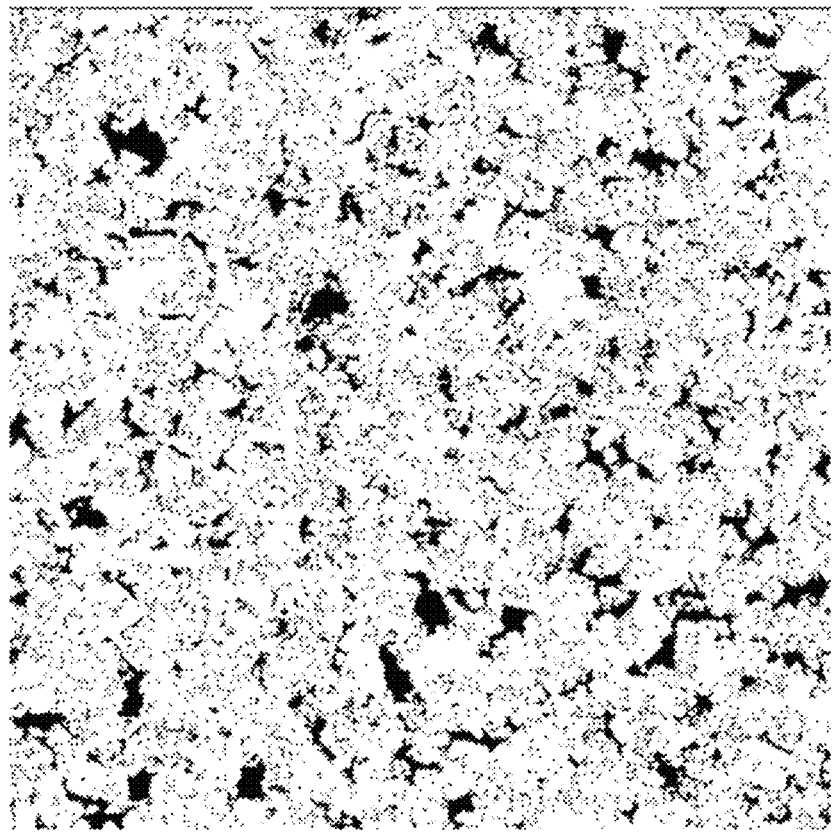

FIG. 9C depicts a negative image 940 of the meshberger dolomite rock sample. The image 940 depicts the pore space in black and the solid material in white. A Hoshen-Kopelman multiple clustering algorithm is applied to the pore space to generate the negative image 940. The image 940 may be used to analyze the depicted pore space and solid material of the example meshberger dolomite rock sample. FIG. 9D depicts an image 960 where watershedding of the solid phase to separate grains in the skeletal-peloid grainstone rock sample has been applied. The image 960 depicts the pores space of the example meshberger dolomite rock sample in white and the solid material in black.

By employing images 900, 920, 940, and 960, process 100 may generate, based on particle areas, equivalent circular diameters of pores and grains to show the pore and grain size distributions within the example meshberger dolomite rock sample. For example, porosities in the example meshberger dolomite rock sample can be categorized into micro- (<2 microns), meso- (2-10 microns), and macro- (>10 microns) porosities. As depicted in the example images 900, 920, 940, and 960, macro-, meso- and micro-porosities are 11.7 percent, 3.2 percent, and 0.3 percent, respectively. Cutoffs for pore type classification may also come from experience or observation of the pore size distribution.

Applying process 100 to the example image of the meshberger dolomite rock sample, both separated pores and grains are fitted with ellipses and an example image of fitted grains may be generated. Additionally, aspect ratio and orientation of the fitting ellipses may also be calculated. For the example meshberger dolomite rock sample used in FIGS. 9A-9D, aspect ratio for pores ranges from 1 to 22.82 with an average 2.23 and for grains from 1 to 11.79 with an average 1.51. As with the example skeletal-peloid grainstone and dolomitic skeletal wackestone rock samples, the pores and grains with size of several pixels were ignored to avoid bias. Distributions of aspect ratios may also be obtained for both grains and pores for the example meshberger dolomite rock sample.

Figure 10:
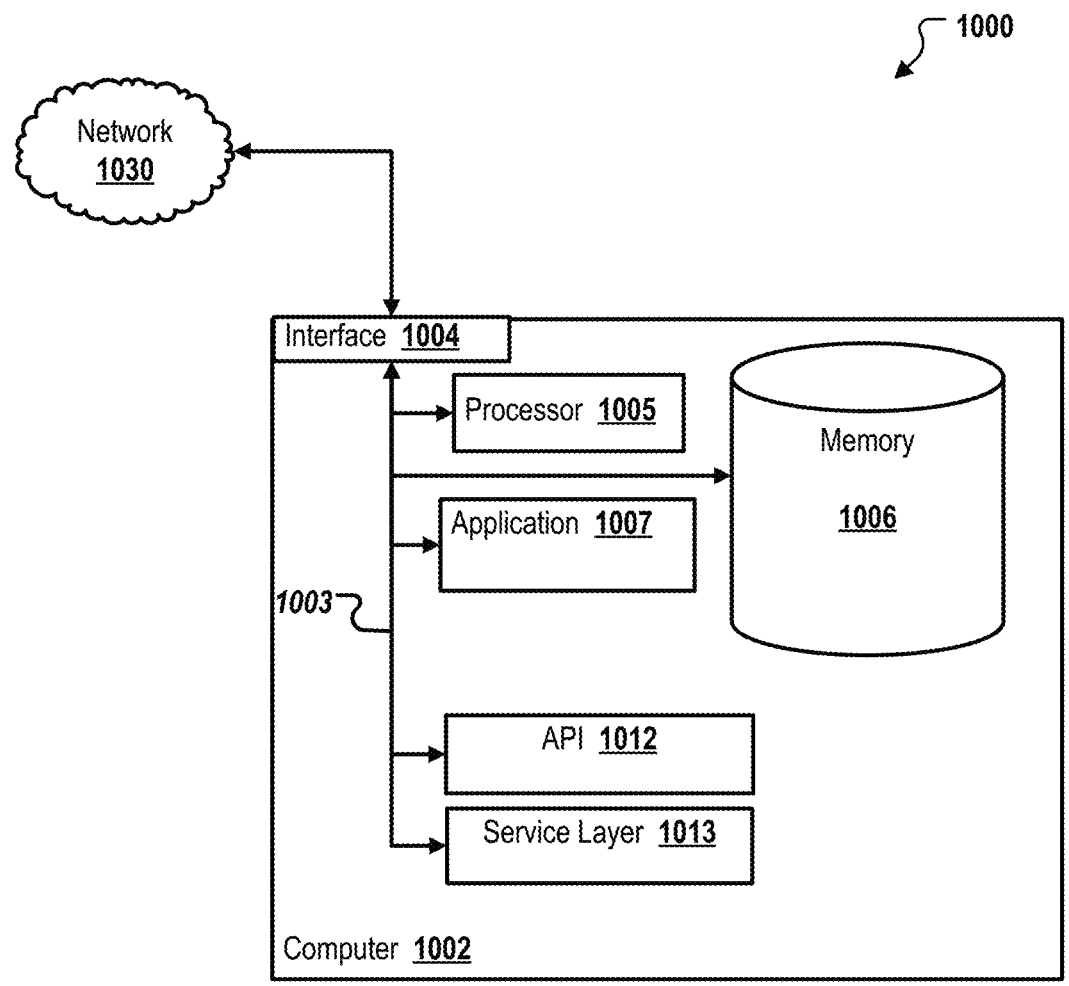
FIG. 10 depicts a block diagram of a computer system used to provide computational functionalities associated with described algorithms, methods, functions, processes, flows, and procedures as described in the instant disclosure, according to an implementation.

FIG. 10 depicts a block diagram of an computer system 1000 used to provide computational functionalities associated with described algorithms, methods, functions, processes, flows, and procedures as described in the instant disclosure, according to an implementation. The illustrated computer 1002 is intended to encompass any computing device such as a server, desktop computer, laptop or notebook computer, wireless data port, smart phone, personal data assistant (PDA), tablet computing device, one or more processors within these devices, or any other suitable processing device, including both physical or virtual instances (or both) of the computing device. Additionally, the computer 1002 may comprise a computer that includes an input device, such as a keypad, keyboard, touch screen, or other device that can accept user information, and an output device that conveys information associated with the operation of the computer 1002, including digital data, visual, or audio information (or a combination of information), or a graphical user interface (GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or other environment (or a combination of environments).

The computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, business intelligence (BI) server, or other server (or a combination of servers).

The computer 1002 can receive requests over network 1030 from a client application (for example, executing on another computer 1002) and responding to the received requests by processing the said requests in an appropriate software application. In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, both hardware or software (or a combination of hardware and software), may interface with each other or the interface 1004 (or a combination of both) over the system bus 1003 using an application programming interface (API) 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment that are connected to the network 1030 (whether illustrated or not). Generally, the interface 1004 comprises logic encoded in software or hardware (or a combination of software and hardware) and operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a memory 1006 that holds data for the computer 1002 or other components (or a combination of both) that can be connected to the network 1030 (whether illustrated or not). For example, memory 1006 can be a database storing data consistent with this disclosure. Although illustrated as a single memory 1006 in FIG. 10, two or more memories may be used according to particular needs, desires, or particular implementations of the computer 1002 and the described functionality. While memory 1006 is illustrated as an integral component of the computer 1002, in alternative implementations, memory 1006 can be external to the computer 1002.

The application 1007 is an algorithmic software engine providing functionality according to particular needs, desires, or particular implementations of the computer 1002, particularly with respect to functionality described in this disclosure. For example, application 1007 can serve as one or more components, modules, and applications. Further, although illustrated as a single application 1007, the application 1007 may be implemented as multiple applications 1007 on the computer 1002. In addition, although illustrated as integral to the computer 1002, in alternative implementations, the application 1007 can be external to the computer 1002.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

Described implementations of the subject matter can include one or more features, alone or in combination.

For example, in a first implementation, a computer-implemented method executed by one or more processor comprises: receiving an image depicting a rock sample from a reserve; binarizing the image into two a first population and a second population, the first population representing empty space in the rock sample, and the second population representing a solid matrix in the rock sample; calculating a porosity of the rock sample based on the first and second populations, the porosity comprising a measure of the empty space in the rock sample; generating a binary image of the rock sample based on the first and second populations when the calculated porosity meets a threshold as compared to a measured value; determining geometrical properties of the empty space and the solid matrix of the rock sample based on a particle analysis of the binary image; generating a digital model of the rock sample based on the geometrical properties of the empty space and the solid matrix of the rock sample; and determining a productivity of the reserve according to the digital model of the rock sample.

The foregoing and other described implementations can each optionally include one or more of the following features.

A first feature, combinable with any of the following features, comprising before binarizing the image, filtering the image to remove noise or enhance a contrast of the image.

A second feature, combinable with any of the previous or following features, wherein the particle analysis of the binary image includes watershedding the binary image to separate grains in the solid matrix in the rock sample from the empty space in the rock sample.

A third feature, combinable with any of the previous or following features, wherein the watershedding is performed on a negative image of the binary image.

A fourth feature, combinable with any of the previous or following features, wherein the particle analysis of the binary image includes applying a Hoshen-Kopelman multi-cluster labeling algorithm to identify grains in the solid matrix and the empty space in the rock sample.

A fifth feature, combinable with any of the previous or following features, wherein the geometrical properties of the empty space and the solid matrix of the rock sample include aspect ratios, orientation, and size distribution.

A sixth feature, combinable with any of the previous or following features, wherein rock model is a histogram or a textual model.

A seventh feature, combinable with any of the previous or following features, wherein the porosity is represented as a fraction of a total volume of the rock sample.

An eighth feature, combinable with any of the previous or following features, wherein the image of the rock sample is a two-dimensional or a three-dimensional array of grayscales.

A ninth feature, combinable with any of the previous or following features, wherein the binary image is a black and white image, wherein black in the black and white image represents the empty space in the rock sample, and wherein white in the black and white image represents the solid matrix of the rock sample.

A tenth feature, combinable with any of the previous or following features, wherein a high resolution imaging technique that is one of confocal microscopy, secondary electron imaging (SEM), or micro-computed tomography (micro-CT) generates the image.

An eleventh feature, combinable with any of the previous or following features, wherein the image depicts a thin or sliced section of the rock sample.

A twelfth feature, combinable with any of the previous or following features, wherein determining the productivity of the reserve includes dielectric simulations or acoustic simulations that are based on the digital model of the rock sample.

In a second implementation, one or more non-transitory computer-readable storage media coupled to one or more processors have instructions stored thereon which, when executed by the one or more processors, cause the one or more processors to perform operations comprising: receiving an image depicting a rock sample from a reserve; binarizing the image into two a first population and a second population, the first population representing empty space in the rock sample, and the second population representing a solid matrix in the rock sample; calculating a porosity of the rock sample based on the first and second populations, the porosity comprising a measure of the empty space in the rock sample; generating a binary image of the rock sample based on the first and second populations when the calculated porosity meets a threshold as compared to a measured value; determining geometrical properties of the empty space and the solid matrix of the rock sample based on a particle analysis of the binary image; generating a digital model of the rock sample based on the geometrical properties of the empty space and the solid matrix of the rock sample; and determining a productivity of the reserve according to the digital model of the rock sample.

The foregoing and other described implementations can each optionally include one or more of the following features.

A first feature, combinable with any of the following features, wherein the particle analysis of the binary image includes watershedding the binary image to separate grains in the solid matrix in the rock sample from the empty space in the rock sample.

A second feature, combinable with any of the previous or following features, wherein the particle analysis of the binary image includes applying a Hoshen-Kopelman multi-cluster labeling algorithm to identify grains in the solid matrix and the empty space in the rock sample.

A third feature, combinable with any of the previous or following features, wherein the geometrical properties of the empty space and the solid matrix of the rock sample include aspect ratios, orientation, and size distribution.

In a third implementation, a computer-implemented system, comprises: one or more processors; and a computer-readable storage device coupled to the one or more processors and having instructions stored thereon which, when executed by the one or more processors, cause the one or more processors to perform operations comprising: receiving an image depicting a rock sample from a reserve; binarizing the image into two a first population and a second population, the first population representing empty space in the rock sample, and the second population representing a solid matrix in the rock sample; calculating a porosity of the rock sample based on the first and second populations, the porosity comprising a measure of the empty space in the rock sample; generating a binary image of the rock sample based on the first and second populations when the calculated porosity meets a threshold as compared to a measured value; determining geometrical properties of the empty space and the solid matrix of the rock sample based on a particle analysis of the binary image; generating a digital model of the rock sample based on the geometrical properties of the empty space and the solid matrix of the rock sample; and determining a productivity of the reserve according to the digital model of the rock sample.

The foregoing and other described implementations can each optionally include one or more of the following features.

A first feature, combinable with any of the following features, wherein the binary image is a black and white image, wherein black in the black and white image represents the empty space in the rock sample, and wherein white in the black and white image represents the solid matrix of the rock sample.

A second feature, combinable with any of the previous or following features, wherein determining the productivity of the reserve includes dielectric simulations or acoustic simulations that are based on the digital model of the rock sample.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX™ UNIX™ WINDOWS™, MAC OS™, ANDROID™, IOS™ or any other suitable conventional operating system.

A computer program may also be referred to or described as a program, software, a software application, a module, a software module, a script, or code. A computer program can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and Compact Disc, read-only-memory (CD-ROM), digital versatile disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A GUI may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method executed by one or more processors, the method comprising:

receiving an image depicting a rock sample from a reserve;

binarizing the image into two a first population and a second population, the first population representing empty space in the rock sample, and the second population representing a solid matrix in the rock sample;

calculating a porosity of the rock sample based on the first and second populations, the porosity comprising a measure of the empty space in the rock sample;

generating a binary image of the rock sample based on the first and second populations when the calculated porosity meets a threshold as compared to a measured value;

determining geometrical properties of the empty space and the solid matrix of the rock sample based on a particle analysis of the binary image;

generating a digital model of the rock sample based on the geometrical properties of the empty space and the solid matrix of the rock sample, wherein the digital model represents materials and structures including pores, grains, and hydrocarbons found in the rock sample, and wherein the digital model includes 2-dimensional (2D) models using ellipses to represent 2D materials and structures, and 3-dimensional (3D) models using ellipsoids to represent 3D materials and structures; and determining a productivity of the reserve according to the digital model of the rock sample.

2. The method of claim 1, further comprising:
before binarizing the image, filtering the image to remove noise or enhance a contrast of the image.

3. The method of claim 1, wherein the particle analysis of the binary image includes watershedding the binary image to separate grains in the solid matrix in the rock sample from the empty space in the rock sample.

4. The method of claim 3, wherein the watershedding is performed on a negative image of the binary image.

5. The method of claim 1, wherein the particle analysis of the binary image includes applying a Hoshen-Kopelman multi-cluster labeling algorithm to identify grains in the solid matrix and the empty space in the rock sample.

6. The method of claim 1, wherein the geometrical properties of the empty space and the solid matrix of the rock sample include aspect ratios, orientation, and size distribution.

7. The method of claim 1, wherein rock model is a histogram or a textual model.

8. The method of claim 1, wherein the porosity is represented as a fraction of a total volume of the rock sample.

9. The method of claim 1, wherein the image of the rock sample is a two-dimensional or a three-dimensional array of gray-scales.

10. The method of claim 1, wherein the binary image is a black and white image, wherein black in the black and white image represents the empty space in the rock sample, and wherein white in the black and white image represents the solid matrix of the rock sample.

11. The method of claim 1, wherein a high resolution imaging technique that is one of confocal microscopy, secondary electron imaging (SEM), or micro-computed tomography (micro-CT) generates the image.

12. The method of claim 1, wherein the image depicts a thin or sliced section of the rock sample.

13. The method of claim 1, wherein determining the productivity of the reserve includes dielectric simulations or acoustic simulations that are based on the digital model of the rock sample.

14. One or more non-transitory computer-readable storage media coupled to one or more processors and having instructions stored thereon which, when executed by the one or more processors, cause the one or more processors to perform operations comprising:

receiving an image depicting a rock sample from a reserve;

binarizing the image into two a first population and a second population, the first population representing empty space in the rock sample, and the second population representing a solid matrix in the rock sample;

calculating a porosity of the rock sample based on the first and second populations, the porosity comprising a measure of the empty space in the rock sample;

generating a binary image of the rock sample based on the first and second populations when the calculated porosity meets a threshold as compared to a measured value;

determining geometrical properties of the empty space and the solid matrix of the rock sample based on a particle analysis of the binary image;

generating a digital model of the rock sample based on the geometrical properties of the empty space and the solid matrix of the rock sample, wherein the digital model represents materials and structures including pores, grains, and hydrocarbons found in the rock sample, and wherein the digital model includes 2-dimensional (2D) models using ellipses to represent 2D materials and structures, and 3-dimensional (3D) models using ellipsoids to represent 3D materials and structures; and determining a productivity of the reserve according to the digital model of the rock sample.

15. The one or more non-transitory computer-readable storage media of claim 14, wherein the particle analysis of the binary image includes watershedding the binary image to separate grains in the solid matrix in the rock sample from the empty space in the rock sample.

16. The one or more non-transitory computer-readable storage media of claim 14, wherein the particle analysis of the binary image includes applying a Hoshen-Kopelman multi-cluster labeling algorithm to identify grains in the solid matrix and the empty space in the rock sample.

17. The one or more non-transitory computer-readable storage media of claim 14, wherein the geometrical properties of the empty space and the solid matrix of the rock sample include aspect ratios, orientation, and size distribution.

18. A computer-implemented system, comprising:
one or more processors; and
a computer-readable storage device coupled to the one or more processors and having instructions stored thereon which, when executed by the one or more processors, cause the one or more processors to perform operations comprising:

receiving an image depicting a rock sample from a reserve;

binarizing the image into two a first population and a second population, the first population representing empty space in the rock sample, and the second population representing a solid matrix in the rock sample;

calculating a porosity of the rock sample based on the first and second populations, the porosity comprising a measure of the empty space in the rock sample;

generating a binary image of the rock sample based on the first and second populations when the calculated porosity meets a threshold as compared to a measured value;

determining geometrical properties of the empty space and the solid matrix of the rock sample based on a particle analysis of the binary image;

generating a digital model of the rock sample based on the geometrical properties of the empty space and the solid matrix of the rock sample, wherein the digital model represents materials and structures including pores, grains, and hydrocarbons found in the rock sample, and wherein the digital model includes 2-dimensional (2D) models using ellipses to represent 2D materials and structures, and 3-dimensional (3D) models using ellipsoids to represent 3D materials and structures; and determining a productivity of the reserve according to the digital model of the rock sample.

19. The computer-implemented system of claim 18, wherein the binary image is a black and white image, wherein black in the black and white image represents the empty space in the rock sample, and wherein white in the black and white image represents the solid matrix of the rock sample.

20. The computer-implemented system of claim 18, wherein determining the productivity of the reserve includes dielectric simulations or acoustic simulations that are based on the digital model of the rock sample.

* * * * *

UNITED STATES PATENT AND TRADEMARK OFFICE
CERTIFICATE OF CORRECTION

Page 1 of 1

PATENT NO.         : 10,891,462 B2
APPLICATION NO.    : 16/167066
DATED              : January 12, 2021
INVENTOR(S)        : Weishu Zhao It is certified that error appears in the above-identified patent and that said Letters Patent is hereby corrected as shown below:

In the Specification

In Column 1, Line 5, please delete "TECHNICAL FIELD" and insert -- CROSS-REFERENCE TO RELATED APPLICATIONS --

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*